United States Patent
Shi et al.

(10) Patent No.: US 8,023,485 B2
(45) Date of Patent: *Sep. 20, 2011

(54) METHOD, SYSTEM AND DEVICE FOR REALIZING USER IDENTITY ASSOCIATION

(75) Inventors: Shufeng Shi, Shenzhen (CN); Xuexia Yan, Shenzhen (CN); Deping Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/938,889

(22) Filed: Nov. 3, 2010

(65) Prior Publication Data

US 2011/0038319 A1   Feb. 17, 2011

Related U.S. Application Data

(63) Continuation of application No. 12/477,318, filed on Jun. 3, 2009, which is a continuation of application No. PCT/CN2008/070036, filed on Jan. 7, 2008.

(30) Foreign Application Priority Data

Jan. 22, 2007  (CN) .......................... 2007 1 0000388
May 31, 2007  (CN) .......................... 2007 1 0108603

(51) Int. Cl.
  *H04W 4/00*  (2009.01)
(52) U.S. Cl. ......... 370/338; 370/400; 370/429; 370/349
(58) Field of Classification Search .................. 370/338, 370/349, 400, 429; 709/228; 455/435.1, 455/432.3, 422.1, 433, 415
See application file for complete search history.

(56) References Cited

U.S. PATENT DOCUMENTS

| | | | |
|---|---|---|---|
| 5,291,593 | A | 3/1994 | Abraham et al. |
| 6,760,585 | B1 | 7/2004 | Stumer et al. |
| 7,127,238 | B2 | 10/2006 | Vandermeijden et al. |
| 7,177,642 | B2 | 2/2007 | Sanchez Herrero et al. |
| 7,483,992 | B2 | 1/2009 | Bahl |
| 7,536,713 | B1 | 5/2009 | Bartholomew |

(Continued)

FOREIGN PATENT DOCUMENTS

CN         1842084 A1    10/2006

(Continued)

OTHER PUBLICATIONS

3rd Generation Partnership Project: Technical Specification Group Services and System Aspects; IP Multimedia Subsystem (IMS); Stage 2 (Release 7), 3GPP TS 23,226 v7.6.0, 215 pages (2006).

(Continued)

*Primary Examiner* — Dang T Ton
*Assistant Examiner* — Robert M Morlan
(74) *Attorney, Agent, or Firm* — Finnegan, Henderson, Farabow, Garrett & Dunner LLP

(57) ABSTRACT

The present invention discloses a method for realizing user identity association, the method comprising: setting an equivalent behavior user identifier in a Home Subscription Server (HSS); associating IMS Public User Identities (IMPUs) with the equivalent behavior through the set equivalent behavior user identifier. The present invention also discloses a system and a device realizing user identity association. According to the embodiments of the present invention, the association of the IMPUs with the set equivalent behavior is realized, which improves the user experiences.

17 Claims, 15 Drawing Sheets

U.S. PATENT DOCUMENTS

| | | | | |
|---|---|---|---|---|
| 2004/0131023 | A1* | 7/2004 | Auterinen | 370/328 |
| 2005/0278431 | A1* | 12/2005 | Goldschmidt et al. | 709/207 |
| 2006/0218291 | A1 | 9/2006 | Zhu et al. | |

FOREIGN PATENT DOCUMENTS

| | | |
|---|---|---|
| CN | 1852293 | 10/2006 |
| CN | 101155060 A | 4/2008 |
| CN | 100551146 C | 10/2009 |
| CN | 101605317 A | 12/2009 |
| EP | 1 975 847 A1 | 10/2008 |
| EP | 1 988 698 A1 | 11/2008 |
| EP | 2 037 658 A1 | 3/2009 |
| GB | 2425685 | 11/2006 |
| WO | WO 02/065804 A1 | 8/2002 |
| WO | WO 2006/082528 | 8/2006 |
| WO | WO 2006/121373 A1 | 11/2006 |
| WO | WO 2007/096001 A1 | 8/2007 |
| WO | WO 2008/138252 A1 | 11/2008 |

OTHER PUBLICATIONS

Russian Office Action (with stamped date of Sep. 29, 2010) in the Application No. 2009127109 filed Jan. 7, 2008, and its English translation; 5 pages.

Written Opinion of the International Searching Authority (translation) dated (mailed) Apr. 17, 2008, issued in related application No. PCT/CN2008/070036, filed Jan. 7, 2008, Huawei Technologies Co., Ltd.

3$^{rd}$ Generation Partnership Project; Technical Specification Group Core Network and Terminals; Organization of subscriber data (Release 7); 3GPP TS 23.008 V7.7.0 Technical Specification, Sep. 2007, 74 pages.

3$^{rd}$ Generation Partnership Project; Technical Specification Group Services and System Aspects; IP Multimedia Subsystem (IMS); Stage 2 (Release 7); 3GPP TS 23.228 V7.7.0, Mar. 2007, 223 pages.

3$^{rd}$ Generation Partnership Project; Technical Specification Group Core Network and Terminals; IP Multimedia (IM) Subsystem Cx and Dx Interfaces; Signalling flows and message contents (Release 7), 3GPP TS 29.228 V7.7.0, Sep. 2007, 61 pages.

3$^{rd}$ Generation Partnership Project; Technical Specification Group Core Network and Terminals; Cx and Dx interfaces based on the Diameter protocol; Protocol details (Release 7), 3GPP TS 29.229 V7.6.0, Sep. 2007, 28 pages.

3$^{rd}$ Generation Partnership Project; Technical Specification Group Core Network and Terminals; IP Multimedia (IM) Subsystem Sh interface; Signalling flows and message contents (Release 7), 3GPP TS 29.328 V7.6.0, Jun. 2007, 41 pages.

US 7,177,842, 02/2007, Herrero et al. (withdrawn)

* cited by examiner

METHOD, SYSTEM AND DEVICE FOR REALIZING USER IDENTITY ASSOCIATION

CROSS-REFERENCE TO RELATED APPLICATIONS

This application is a continuation of U.S. patent application Ser. No. 12/477,318, filed on Jun. 3, 2009, which is a continuation of International Application No. PCT/CN2008/070036, filed on Jan. 7, 2008, which claims priority to Chinese Patent Application No. 200710000388.5, filed on Jan. 22, 2007, and Chinese Patent Application No. 200710108603.3, filed on May 31, 2007, all of which are hereby incorporated by reference in their entireties.

FIELD OF THE INVENTION

The present invention relates to IP Multimedia Subsystem (IMS), and more particularly, to a method, system and device for realizing user identity association.

BACKGROUND

IMS is a subsystem proposed by the 3rd Generation Partnership Project (3GPP) which supports IP multimedia services. The essential feature of the IMS is the realization of the separation between service management, session control and bearer access with the deployment of the Session Initiation Protocol (SIP) as the call control protocol. The IMS is a multimedia control/call control platform over a packet domain and supports both session and non-session multimedia services. The IMS provides a general service platform for multimedia applications.

FIG. 1 illustrates a partial architecture diagram of the IMS, in which a Call Session Control Function (CSCF) is a central control part in the IMS core network and is responsible for subscription authentication of a User Equipment (UE) and session control. The CSCF performs basic session route function with respect to the calling and called users and conducts route trigger for valued added services to an Application Server (AS) and service control interaction when a condition is met, according to IMS Initial Filter Criteria (iFC) subscribed by the user. A Home Subscriber Server is a user database server which saves IMS subscription information of the user, i.e., association information between the user identity and user subscription data. When the user conducts a service operation, related entities in the IMS, such as an Interrogating CSCF (I-CSCF), a Serving CSCF (S-CSCF) and the AS, obtain the subscription data of the related user from the HSS, through the user identity. In the IMS subscription information, a set of user subscription data related to the service is referred to as a Service Profile (SP).

FIG. 2 is a diagram illustrating the relationship between the user identity and the SP. As shown in FIG. 2, the user identity includes an IMS Private User Identity (IMPI) and an IMS Public User Identity (IMPU). An IMPI belongs to only one IMS subscription and one IMS subscription may include a plurality of IMPIs. An IMPI may include a plurality of IMPUs and an IMPU may be shared by a plurality of IMPIs. An IMPU has only one SP and one SP may be shared by a plurality of IMPUs.

SUMMARY

Accordingly, on one hand, embodiments of the invention provide two methods for realizing user identity association; on the other hand, embodiments of the invention provide a system and device for realizing user identity association, so that IMPUs with the equivalent behavior can be associated.

The first method for realizing user identity association provided by an embodiment of the invention includes:
  setting an equivalent behavior user identifier in an HSS; and
  associating IMS Public User Identities (IMPUs) with the equivalent behavior through the set equivalent behavior user identifier.

The system for realizing user identity association provided by an embodiment of the invention includes an HSS and a first requesting entity, where:
  the HSS is adapted to associate IMPUs with equivalent behavior and to transmit association information of the IMPUs with the equivalent behavior to the first requesting entity by carrying the information in a message; and
  the first requesting entity is adapted to parse the message from the HSS and to obtain the association information of the IMPUs with the equivalent behavior from the message.

The device for realizing user identity association provided by an embodiment of the invention includes an indication setting module and an indication presenting module, where:
  the indication setting module is adapted to set an equivalent behavior user identifier in an HSS;
  the indication presenting module is adapted to associate IMPUs with the equivalent behavior using the equivalent behavior user identifier set by the indication setting module.

The second method for realizing user identity association provided by an embodiment of the invention includes:
  associating IMPUs with equivalent behavior in an HSS, where the IMPUs with the equivalent behavior are IMPUs with the same SP, and the same service data and belong to the same IRPUIS; and
  saving, by the HSS, association information of the IMPUs with the equivalent behavior.

It can be seen from the above solutions that, the embodiments of the invention set the equivalent behavior user identifier in the HSS and associate the IMPUs with the set equivalent behavior user identifier. As a result, the association of the IMPUs with the set equivalent behavior is realized in the HSS, which improves the user experiences.

DETAILED DESCRIPTION

According to an embodiment of the invention, an equivalent behavior user identifier is set in the HSS, and IMPUs with equivalent behavior are associated using the equivalent behavior user identifier.

two or more subscribed IMPUs share the same SP and have the same service data, such as forwarded to address information, exactly the same representation information, which means the two or more IMPUs have an equivalent behavior.

Figure 3:
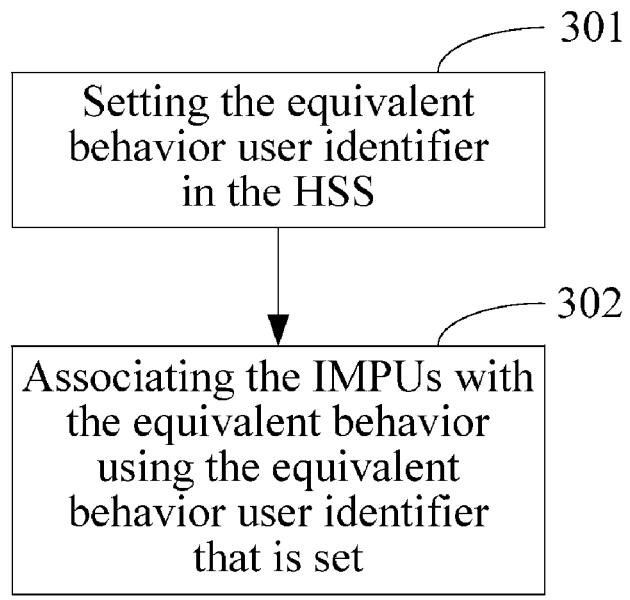
FIG. 3 is an exemplary flow chart of a method for realizing user identity association according to an embodiment of the present invention.

Please refer to FIG. 3, which is an exemplary flow chart of a method for associating user identities according to an embodiment of the present invention. As shown in FIG. 3, the flow includes the following steps:

Step 301: Setting the equivalent behavior user identifier in the HSS.

In this step, there are at least the following two method for setting the equivalent behavior user identifier in the HSS:

With the first method, an indication is set for indicating a set of IMPUs with the equivalent behavior in the HSS.

With the second method, an indication is set for indicating a set of IMPUs with the equivalent behavior to which the IMPU belongs with the IMPU of the HSS.

Step 302: Associating the IMPUs with the equivalent behavior using the equivalent behavior user identifier that is set.

For the first method of step 301, the set indication is used to arrange the IMPUs with the equivalent behavior in a set in this step. Thus, the indication includes one or more sets of IMPUs with the equivalent behavior, and each set of IMPUs with the equivalent behavior includes one or more IMPUs.

For the second method of step 301, the set indication is used to indicate the set of IMPUs with the equivalent behavior to which the IMPU belongs. Thus, the value of the indication is used to determine which set of IMPUs with the equivalent behavior the IMPU belongs to.

Furthermore, the HSS may present association information of the IMPUs with the equivalent behavior to an S-CSCF, and/or, the HSS may present the association information of the IMPUs with the equivalent behavior to an AS.

Furthermore, the S-CSCF may present the association information of the IMPUs with the equivalent behavior to the AS, and/or, the S-CSCF may present the association information of the IMPUs with the equivalent behavior to a P-CSCF, and/or, the S-CSCF presents the association information of the IMPUs with the equivalent behavior to an UE.

Furthermore, the association information of the IMPUs with the equivalent behavior may be included in service information of the iFC related to the IMPU in the HSS. When the S-CSCF requests the user data from the HSS, the S-CSCF downloads the iFC with the service information including the association information of the IMPUs with the equivalent behavior from the HSS, and the S-CSCF presents the service information including the association information of the IMPUs with the equivalent behavior to the AS by carrying it in a message, when the iFC is met. The AS may obtain the association information of the IMPUs with the equivalent behavior from the message.

Figure 4:
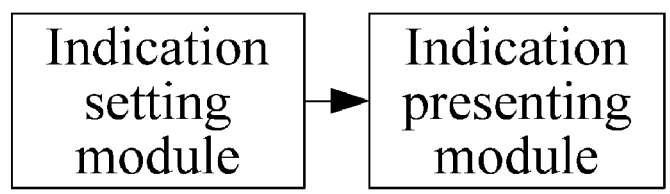
FIG. 4 is an exemplary flow chart of a device for realizing user identity association according to an embodiment of the present invention.

Please refer to FIG. 4, which is an exemplary block diagram of a device for realizing user identity association according to an embodiment of the invention. As shown in FIG. 4, the device includes an indication setting module and an indication presenting module.

Wherein, the indication setting module is adapted to set the equivalent behavior user identifier in the HSS.

The indication presenting module is adapted to associate the IMPUs with the equivalent behavior using the equivalent behavior user identifier set by the indication setting module.

Furthermore, in order to make it possible for the user to register a plurality of IMPUs in the IMS network, an implicit registering mechanism is provided. That is, when any of the IMPUs belonging to an Implicitly Registered Public User Identity Set (IRPUIS) is registered, the other IMPUs in the IRPUIS are registered at the same time. Furthermore, the IMPUs in the same IRPUIS must belong to the same IMPI, and the IMPUs may have the same or different SPs, however, the same IMPU belongs to only one IRPUIS.

Figure 1:
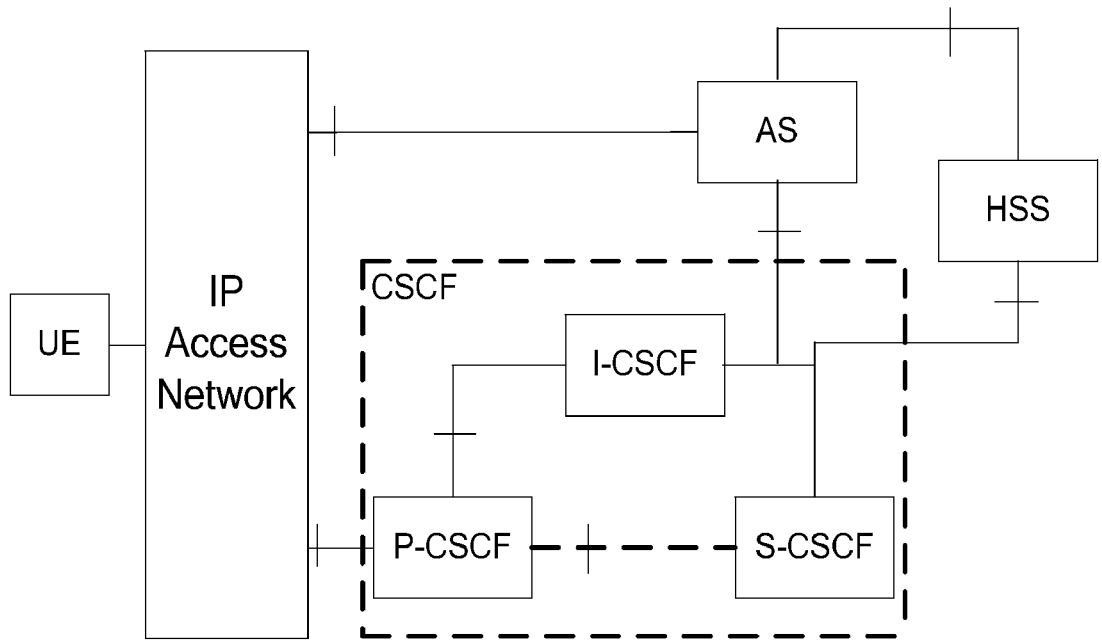
FIG. 1 is a partial architecture diagram of IMS.
Figure 2:
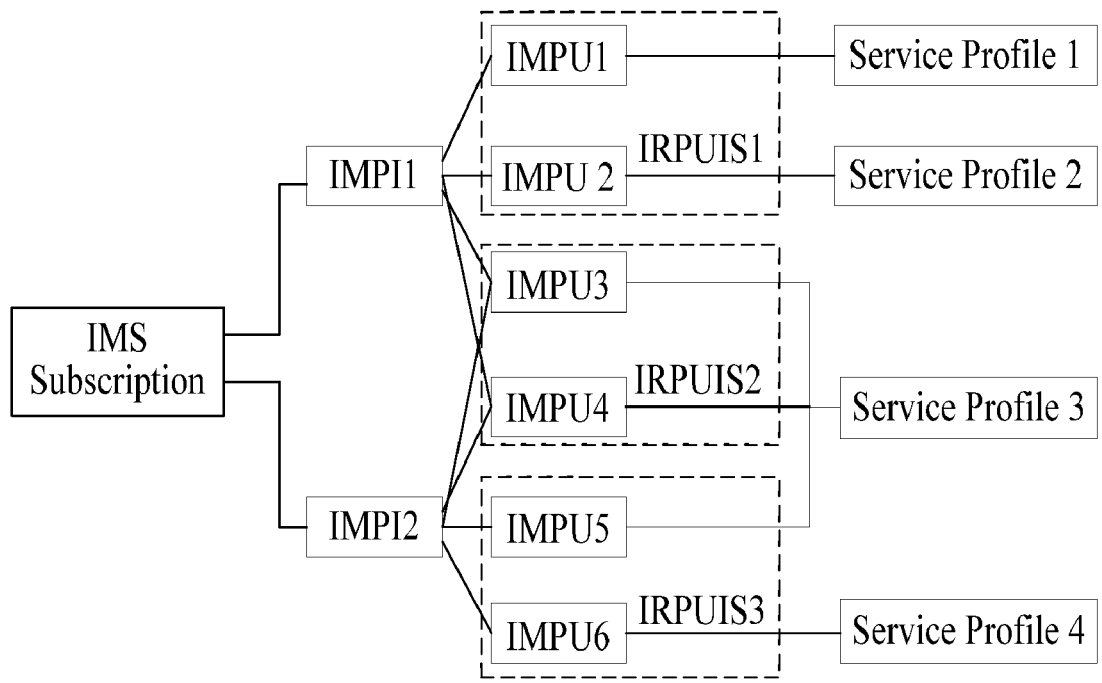
FIG. 2 is a diagram illustrating the relationship between a user identity and an SP.

As shown in FIG. 2, IMPU1 and IMPU2 belong to the same IRPUIS. When IMPU1 is registered in the network, IMPU2 will get registered too. Similarly, when IMPU2 is registered in the network, IMPU1 will get registered too. Here, IMPU1 and IMPU2 have different SPs. Each of the IMPU3 and IMPU4 of FIG. 2 is an IRPUIS shared by IMPI1 and IMPI2 and has the same SP. Each of the IMPU5 and IMPU6 of FIG. 2 is an IRPUIS belonging to IMPI2 and has different SPs. Where, IMPU5 has an SP which is the same as that IMPU3 and IMPU4 have.

The set of IMPUs with the equivalent behavior according to the embodiments of the invention may be a subset of the IRPUIS or a set of IMPUs with the equivalent behavior independent of the IRPUIS. For the convenience of description, the IMPUs with the equivalent behavior are referred to as Alias Public User Identity (APUI) and the set of IMPUs with the equivalent behavior is referred to as Alias Public User Identity Set (APUIS) in this description.

In the following, the method, system and device for realizing user identity association will be described in detail with reference to some embodiments.

Embodiment One

The first method is used, that is, an indication used for indicating the IMPUs with the equivalent behavior is set in the HSS.

Figure 5:
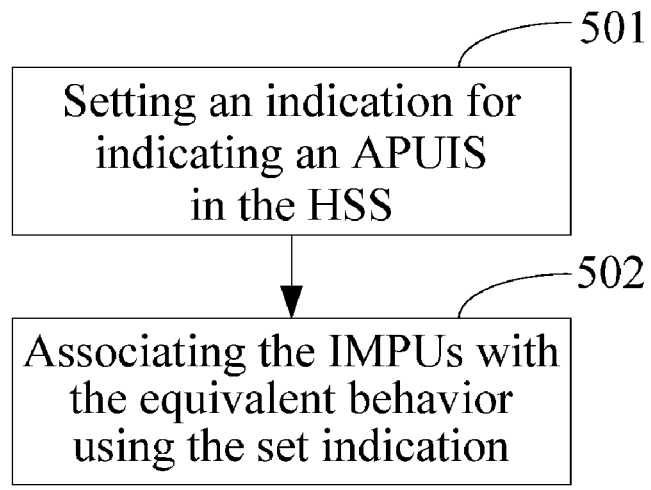
FIG. 5 is a flow chart of a method for realizing user identity association according to a first embodiment of the present invention.

Please refer to FIG. 5, which is a flow chart of a method for realizing user identity association according to the first embodiment of the invention. As shown in FIG. 5, the flow includes the following steps:

Step 501: Setting an indication for indicating an APUIS in the HSS.

In this step, a type of data is added to the HSS. This type of data is configured to indicate the APUIS and works as the indication of the APUIS. It may be a subset of an IRPUIS of a corresponding user or a set independent of the IRPUIS. Please refer to Table 1, which is a detailed implementation of the embodiment. The indication used for indicating the APUIS added to Table 1 is named as Alias Public User Identity Set and may be added to a corresponding sub-clause as required, which is represented with 3.X.X in Table 1.

TABLE 1

| PARAMETER | Sub-clause | HSS | S-CSCF | AS | TYPE |
|---|---|---|---|---|---|
| Private User Identity | 3.1.1 | M | M | — | P |
| Public User Identity | 3.1.2 | M | M | — | P |
| Barring Indication | 3.1.3 | M | M | — | P |
| List of authorized visited network identifiers | 3.1.4 | M | — | — | P |
| Services related to Unregistered State | 3.1.5 | M | — | — | P |
| Implicitly registered Public User Identity sets | 3.1.6 | C | C | — | P |
| Alias Public User Identity Sets | 3.X.X | C | C | — | P |
| Default Public User Identity indicator | 3.1.7 | C | — | — | P |
| Display Name | 3.1.9 | C | C | — | P |
| Registration Status | 3.2.1 | M | — | — | T |
| S-CSCF Name | 3.2.2 | M | — | — | T |
| Diameter Client Address of S-CSCF | 3.2.3 | M | — | — | T |
| Diameter Server Address of HSS | 3.2.4 | — | M | C | T |
| RAND, XRES, CK, IK and AUTN | 3.3.1 | M | C | — | T |
| Server Capabilities | 3.4.1 | C | C | — | P |
| Initial Filter Criteria | 3.5.2 | C | C | — | P |
| Application Server Information | 3.5.3 | C | C | — | P |
| Service Indication | 3.5.4 | M | — | M | P |
| Shared iFC Set Identifier | 3.5.5 | C | C | | P |
| ... | ... | ... | ... | ... | ... |

In Table 1, "M" represents mandatory, "C" represents conditional and "-" represents not available. Type "P" represents a static permanent type, and "T" represents a dynamic temporary type.

Step 502: Associating the IMPUs with the equivalent behavior using the indication set above.

In this step, the set indication is used to indicate the IMPUs with the equivalent behavior, that is, one or more APUISs. Each APUIS includes one or more IMPUs and the IMPUs have exactly the same SP and exactly the same service data, that is, they have the equivalent behavior. There may be a plurality of APUISs under an IMS subscription, and there may even be a plurality of APUISs under each IRPUIS, though each IMPU may belong to only one APUIS.

The method for realizing identity association is described in detail in the above. In the following, the device for realizing identity association will be described in detail.

The structure, connection relationship and function of the device according to this embodiment of the invention are the same as the device shown in FIG. 4 except that the device of this embodiment is an instantiation of the device shown in FIG. 4. That is to say, the indication setting module in the device is adapted to set the indication used for indicating the APUIS in the HSS.

Embodiment Two

The second method is used, that is, an indication used for indicating a set of IMPUs with the equivalent behavior to which an IMPU belongs is set with the IMPU in the HSS.

Figure 6:
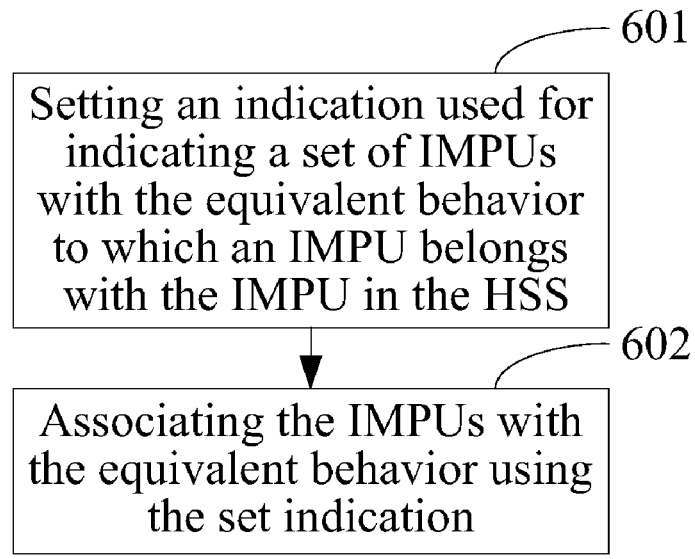
FIG. 6 is a flow chart of a method for realizing user identity association according to a second embodiment of the present invention.

Please refer to FIG. 6, which is a flow chart of a method for realizing user identity association according to the second embodiment of the invention. As shown in FIG. 6, the flow includes the following steps:

Step 601: Setting an indication used for indicating a set of IMPUs with the equivalent behavior to which an IMPU belongs with the IMPU in the HSS.

In this step, a number can be added for each IMPU belonging to an APUIS in the IRPUIS corresponding to an IMPU in the HSS. The number is configured to indicate the APUIS to which the IMPU belongs and works as the indication of the APUIS to which the IMPU belongs.

Alternatively, a number can be added for each IMPU belonging to an APUIS independent of the IRPUIS. The number is configured for indicating the APUIS to which the IMPU belongs and works as the indication of the APUIS to which the IMPU belongs.

Step 602: Associating the IMPUs with the equivalent behavior using the indication set above.

In this step, the set indication is used to indicate those IMPUs in the IRPUIS that have exactly the same SP and service data to the IMPU, that is to say, they have they equivalent behavior.

Alternatively, the set indication is used to indicate the IMPUs that have exactly the same SP and service data to the IMPU, that is to say, they have equivalent behavior.

When there is a plurality of APUISs, the indication is used to indicate the APUIS to which the IMPU belongs. The IMPUs with the same number belong to the same APUIS.

The method for realizing identity association is described in detail in the above. In the following, the device for realizing identity association will be described in detail.

The structure, connection relationship and function of the device according to the embodiment of the invention are the same as the device shown in FIG. 4 except that the device of the embodiment is an instantiation of the device shown in FIG. 4. That is to say, the indication setting module in the device is adapted to set the indication used for indicating the APUIS to which an IMPU belongs with the IMPU in the HSS.

The method and device for realizing user identity association in the HSS are described in detail in the above two embodiments. In practical applications, the AS, UE, P-CSCF, S-CSCF may also need to know the information of the associated IMPUs. For example, the S-CSCF needs to know which IMPUs have the equivalent behavior so that the information may be provided to the AS, P-CSCF. When the user modifies the service data of IMPU1 through the UE, the user may need to know whether the modification is applicable to IMPU2 too. When the AS transmits a message to the IMPU1, the AS may need to know whether the same message should be transmitted to IMPU2 too. The P-CSCF may need to provide the IMPUs with the equivalent behavior to a policy-decision-point in an access network so that the same policy is selected for the IMPUs with the equivalent behavior. Thus, the HSS may further include presenting the association information of the IMPUs with the equivalent behavior to the network entity, such as the S-CSCF or AS.

In the prior art, the S-CSCF assigned to the user may obtain the service subscription information of the user from the HSS using a Server-Assignment-Request (SAR)/Server-Assignment-Answer (SAA) commands pair, and the HSS may update the service subscription information to be modified to the S-CSCF using a Profile-Push-Request (PPR)/Profile-Push-Answer (PPA) command. In the message, the service subscription information is included in a Diameter Attribute Value Pair (AVP) as an eXtensible Markup Language (XML) file. Here, the message interaction between the HSS and S-CSCF may be done through the interface Cx.

In the prior art, if there is an IRPUIS, when the S-CSCF assigned for the user requests to download the user subscription data of a certain IMPU from the HSS, the HSS will return the SP information of all the IMPUs in the IRPUIS to which the IMPU belongs to the S-CSCF.

For example, if IMPU1, IMPU2 and IMPU3 belong to the same IRPUIS and IMPU1 and IMPU2 have the same SP1 while IMPU3 has another SP2, when the S-CSCF requests the data of any of the IMPUs in the IRPUIS, the content of the XML file included in the SAA may be as follows:

```
<?xml version="1.0" encoding="UTF-8"?>
<IMSSubscription    xmlns:xsi="http://www.w3.org/2001/XMLSchema-instance";   IMS subscription begins
xsi:noNamespaceSchemaLocation="D:\ \CxDataType.xsd">
     <PrivateID>IMPI1@homedomain.com</PrivateID> ; IMPI1
     <ServiceProfile>                        ; SP begins
         <PublicIdentity>                    ; Public identity begins
             <BarringIndication>1</BarringIndication>   ; barring indication
             <Identity>  sip:IMPU1@homedomain.com  </Identity>;  identity  of IMPU1
         </PublicIdentity>                   ; Public identity ends
         <PublicIdentity>                    ; Public identity begins
             <Identity>  sip:IMPU2@homedomain.com  </Identity>;  identity  of IMPU2
         </PublicIdentity>                   ; Public identity ends
         <InitialFilterCriteria>             ; iFC begins
             <Priority>0</Priority>
             <TriggerPoint>
                 <ConditionTypeCNF>1</ConditionTypeCNF>
                 <SPT>
                     <ConditionNegated>0</ConditionNegated>
                     <Group>0</Group>
                     <Method>INVITE</Method>
                 </SPT>
                 <SPT>
                     <ConditionNegated>0</ConditionNegated>
                     <Group>0</Group>
                     <Method>MESSAGE</Method>
                 </SPT>
                 <SPT>
                     <ConditionNegated>0</ConditionNegated>
                     <Group>0</Group>
                     <Method>SUBSCRIBE</Method>
                 </SPT>
                 <SPT>
                     <ConditionNegated>0</ConditionNegated>
                     <Group>1</Group>
                     <Method>INVITE</Method>
                 </SPT>
                 <SPT>
                     <ConditionNegated>0</ConditionNegated>
                     <Group>1</Group>
                     <Method>MESSAGE</Method>
                 </SPT>
                 <SPT>
                     <ConditionNegated>1</ConditionNegated>
                     <Group>1</Group>
                     <SIPHeader>
                         <Header>From</Header>
                         <Content>"joe"</Content>
                     </SIPHeader>
                 </SPT>
             </TriggerPoint>
             <ApplicationServer>                       ; AS begins
                 <ServerName>sip:AS1@homedomain.com</ServerName> ; name of AS
```

```
        <DefaultHandling>0</DefaultHandling>;   default handling
    </ApplicationServer>                        ; AS ends
   </InitialFilterCriteria>            ; iFC ends
  </ServiceProfile>               ; SP ends
  <ServiceProfile>                ; SP begins
    <PublicIdentity>                   ; Public identity begins
      <Identity> sip:IMPU3@homedomain.com </Identity>; identity of
IMPU3
    </PublicIdentity>                  ; Public identity ends
    <InitialFilterCriteria>            ; iFC bedins
    .
    .
    .
    <InitialFilterCriteria>     ; iFC ends
  </ServiceProfile>             ; SP ends
</IMSSubscription>            ; IMS ends
```

In the above XML file, it is an IMS subscription from 'IMS subscription begins' to 'IMS subscription ends'. There are two SPs in the above IMS subscription and it is an SP from 'SP begins' to 'SP ends'. One SP includes IMPU and iFC, etc.

Figure 7:
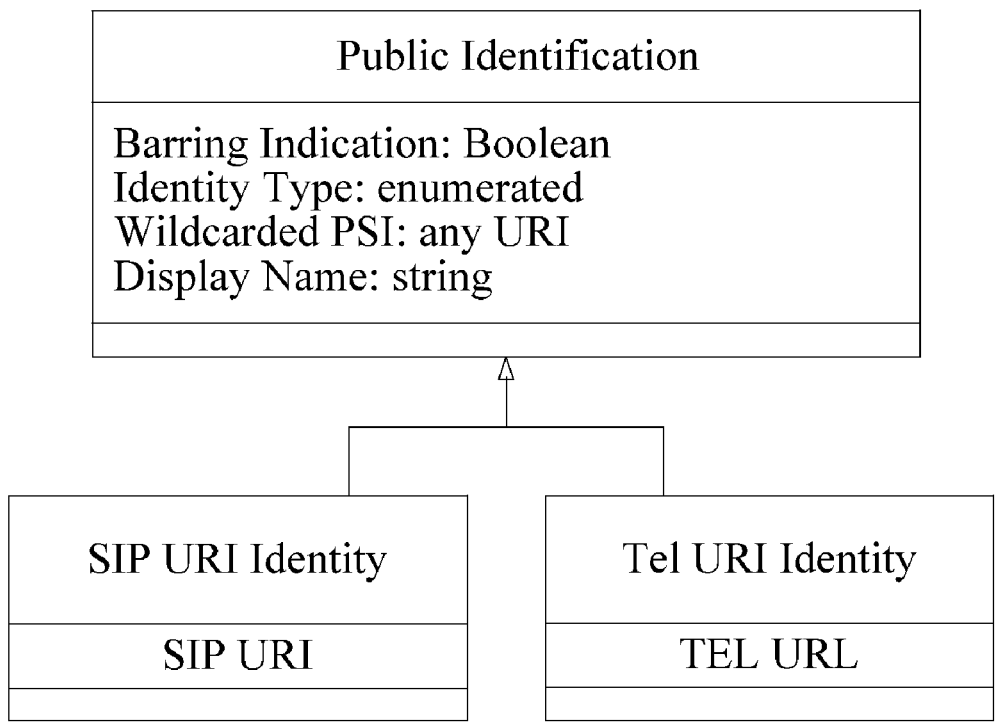
FIG. 7 is a diagram illustrating the structure of Public Identity class in the prior art.

FIG. 7 is a diagram illustrating the structure of Public Identity class in the prior art. As shown in FIG. 7, the Public Identity includes public identities related to the SP and the public identities may be in the form of SIP Universal Resource Identifier (URI) or Tel URI. Each Public Identity includes a related BarringIndication. If the BarringIndication is set, the S-CSCF will prevent the IMPU from being used in any other IMS communication except for Registration and De-registration. The Public Identity also includes an IdentityType, which is used for indicating the type of the public identity, such as an IMPU or an independent Public Service Identity or a PSI matched with a Wildcarded PSI. Here, IdentityType is an enumerated type and has 3 values: 0 indicates that the Public Identifier is an IMPU; 1 indicates that the Public Identifier is an independent PSI; and 2 indicates that the Public Identifier is a PSI that may be matched with the Wildcarded PSI. Furthermore, the public identity may also include DisplayName, etc.

In the above XML file, there are two Public Identities, which includes IMPU1 and IMPU2 respectively, which shows that the two IMPUs have the same SP. There is only one Public Identity IMPU3 in the second SP.

iFC is used for service trigger and describes when the received SIP message will be triggered to a specific application server or AS.

Furthermore, the SP may also include core network service authorization and shared iFC, etc.

In the embodiment of the invention, in order to make it possible to present the association information of the IMPUs with the equivalent behavior to the S-CSCF by the HSS, the HSS may extend the XML files related to the SP that are transmitted to the S-CSCF. The extension may be done with at least the following five methods.

Method one: The HSS adds a new class indicating the alias identity in the SP transmitted to the S-CSCF. The IMPUs with the equivalent behavior are indicated in the added new class indicating the alias identity, and the HSS presents the association information to the S-CSCF by the SP carrying the indication.

Method two: The HSS adds an attribute indicating the set to which the IMPU belongs in the Public Identity class in the SP transmitted to the S-CSCF. The sets of IMPUs with the equivalent behavior to which each IMPU belongs are indicated by assigning a value to the attribute. The HSS presents the association information to the S-CSCF by the SP carrying the indication.

Method three: The HSS adds a new class indicating members of the set to which the IMPU belongs in the Public Identity class in the SP transmitted to the S-CSCF. The IMPUs with the equivalent behavior to each IMPU are indicated in the added class. The HSS presents the association information to the S-CSCF by the SP carrying the indication.

Method four: If there is one set of IMPUs with equivalent behavior among the IMPUs with the same SP, the HSS may extend the value field of the attribute IdentityType in the Public Identity class in the SP transmitted to the S-CSCF and indicate the IdentityType of the IMPUs with the equivalent behavior using the extended IdentityType value. The HSS presents the association information to the S-CSCF by the SP carrying the IdentityType indication.

Method five: If there is one set of IMPUs with equivalent behavior among the IMPUs with the same SP, the HSS adds an attribute indicating whether the IMPU has the equivalent behavior to the Public Identity class in the SP transmitted to the S-CSCF. Whether the IMPU belongs to the set of IMPUs with the equivalent behavior is indicated by assigning values to the attribute. The HSS presents the association information to the S-CSCF by the SP carrying the indication.

In the following, the method, device and system for realizing user identity association employing the above five implementation methods will be described in detail with reference to the embodiments.

Embodiment Three

Method one is used.

Figure 8:
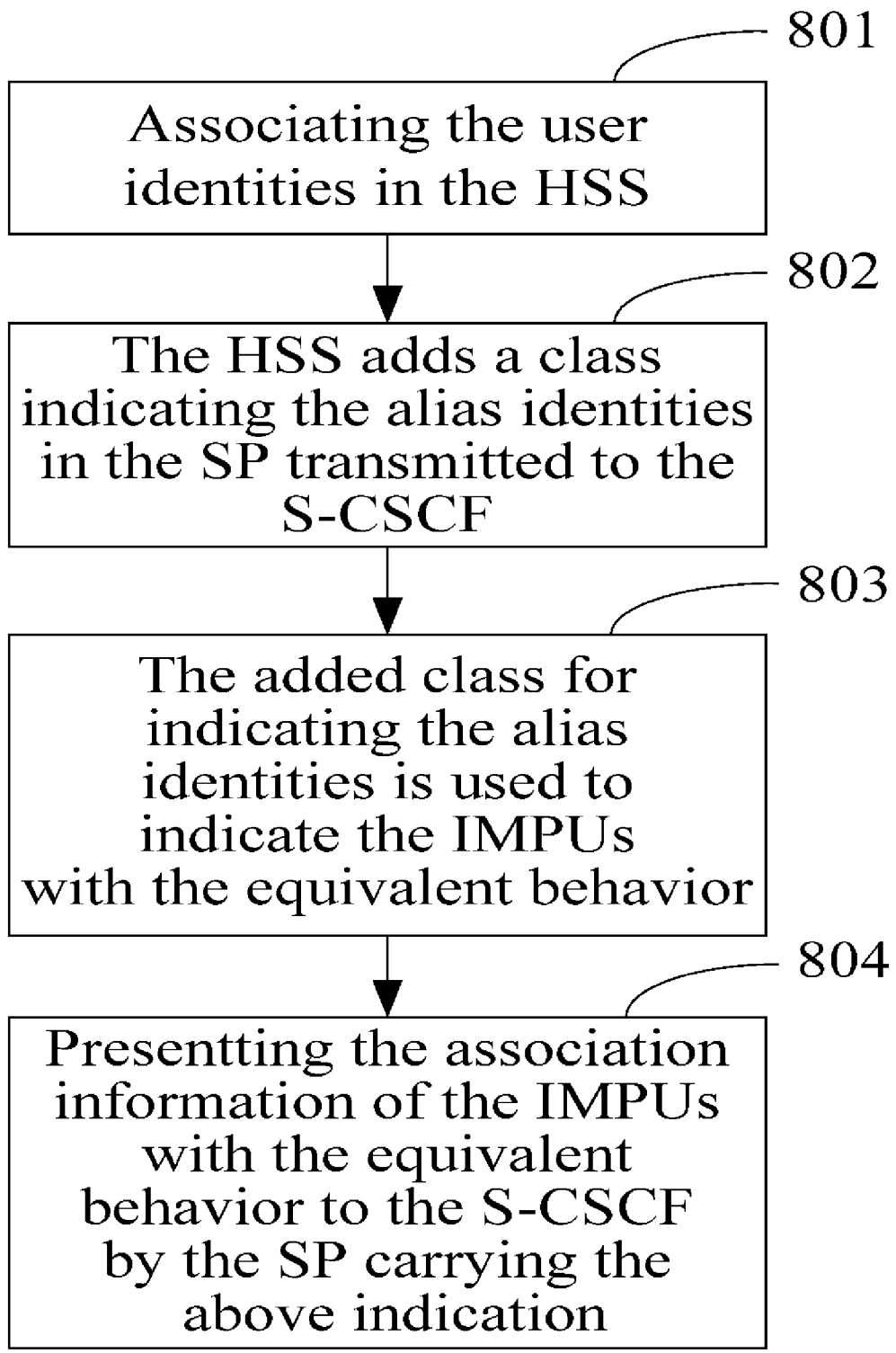
FIG. 8 is a flow chart of a method for realizing user identity association according to a third embodiment of the present invention.

Please refer to FIG. 8, which is a flow chart of the method for realizing user identity association according to the third embodiment of the invention. As shown in FIG. 8, the flow includes the following steps:

Step 801: Associating the user identities in the HSS.

The detailed implementation of the step may be the same as the description of embodiment one or two. It may also take other implementation method as actually required.

Step 802: The HSS adds a class indicating the alias identity in the SP transmitted to the S-CSCF.

Figure 9:
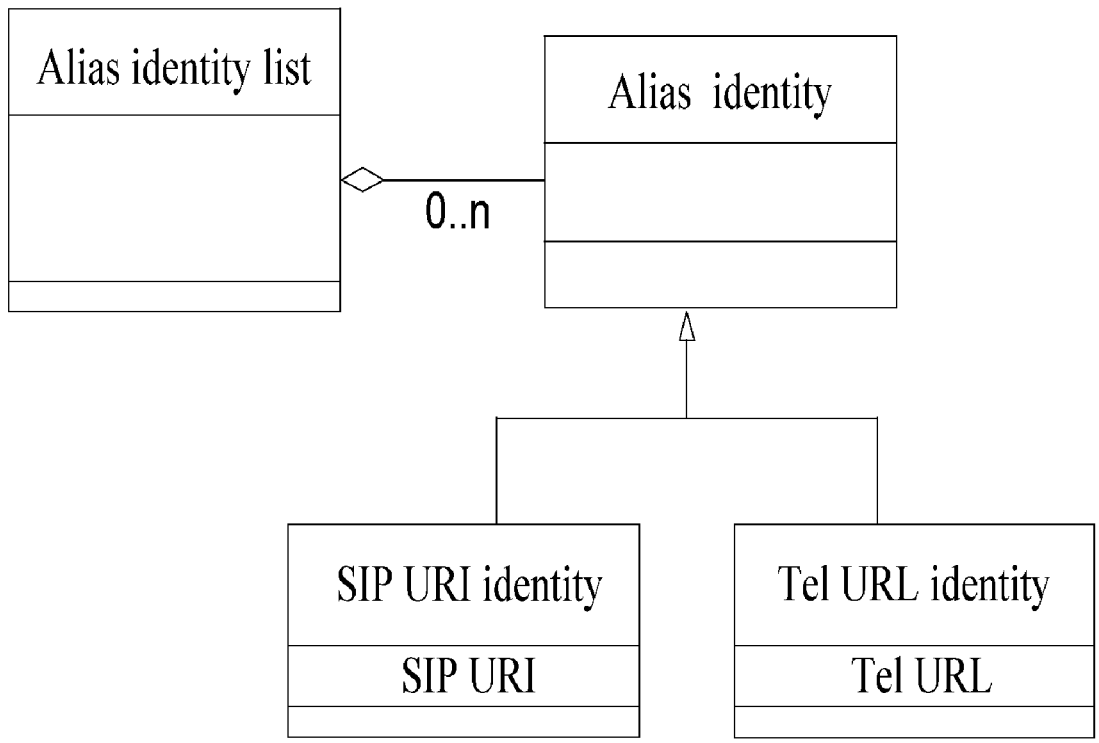
FIG. 9 is a diagram illustrating the structure of an added class that indicates an alias identity according to the third embodiment of the present invention.

In the embodiment, when the HSS extends the XML file related to the SP that is transmitted to the S-CSCF, the class used for indicating the alias identity similar to the Public Identity class may be added to the SP, as shown in FIG. 9, which is a diagram illustrating the structure of the added class that indicates the alias identity according to the embodiment. The added class that indicates the alias identity may include one or more IMPUs having the equivalent behavior, and the IMPUs may be in the form of SIP URI or TEL URI. Here, the instance of the added class that indicates the alias identity is 0 or more than 0.

In a detailed implementation, if the added class that indicates the alias identity is named Alias Identity List, then a description relation mapping of the XML file with the class that indicates the alias identity added is as shown in Table 2:

TABLE 2

| Data type | Tag | Compound of | | |
|---|---|---|---|---|
| | | Tag | Type | Cardinality |
| tIMS Subscription | IMSSubscription | PrivateID | tPrivateID | 1 |
| | | ServiceProfile | tServiceProfile | (1 to n) |
| tServiceProfile | ServiceProfile | PublicIdentity | tPublicIdentity | (1 to n) |
| | | InitialFilterCriteria | tInitialFilterCriteria | (0 to n) |
| | | CoreNetworkServicesAuthorization | CoreNetworkServicesAuthorization | (0 to 1) |
| | | Extension | tServiceProfileExtension | (0 to 1) |
| tServiceProfileExtension | Extension | SharedIFCSetID | tSharedIFCSetID | (0 to n) |
| | | Extension | tServiceProfileExtension2 | (0 to 1) |
| tServiceProfileExtension2 | Extension | AliasIdentityList | tAliasIdentityList | (0 to 1) |
| tAliasIdentityList | AliasIdentityList | AliasIdentity | tAliasIdentity | (1 to n) |
| tAliasIdentity | AliasIdentity | Identity | tIdentity | (1) |
| tPublicIdentityExtension2 | Extension | DisplayName | tDisplayName | (0 to 1) |

In Table 2, the newly added class indicating the alias identity is named Alias Identity List, which is obtained in an extension field of tServiceProfileExtension. When there is no IMPU with the equivalent behavior, the number of instance of Alias Identity List is 0. When there are more than one set of IMPUs with the equivalent behavior, the number of instance of Alias Identity List is more than one. One Alias Identity List may include one or more Alias Identity classes. One Alias Identity class includes an Identity, which is similar to the Identity in the Public Identity class shown in FIG. 7. Also the identity in the Alias Identity class may be in the form of SIP URI or TEL URI; where, an identity corresponds to an IMPU with the equivalent behavior and one Alias Identity List may include a plurality of IMPUs.

Step 803: The added class for indicating the alias identity is used to indicate the IMPUs with the equivalent behavior.

In this step, the instance of each newly added class indicating the alias identity, i.e., the instance of the Alias Identity List class in step 802, includes the set of IMPUs with the equivalent behavior. Different sets of IMPUs with the equivalent behavior may be indicated using the instance of the different Alias Identity Lists class.

Step 804: HSS presents the association information of the IMPUs with the equivalent behavior to the S-CSCF by the SP carrying the above indication.

In this step, the HSS transmits the XML file carrying the SP indicating the IMPUs with the equivalent behavior to the S-CSCF, which parses the association information of the IMPUs with the equivalent behavior, according to the received XML file.

An example is that IMPU1 and IMPU2 have the equivalent behavior and IMPU3 and IMPU4 have the equivalent behavior. The case of there is an IRPUIS and the set of IMPUs with the equivalent behavior is the subset of the IRPUIS is taken as the example. If IMPU1, IMPU2, IMPU3 and IMPU4 are in the same IRPUIS, when the S-CSCF requests the user data of IMPU1 from the HSS through the SAR, the content of the XML file carried in the SAA is as follows:

```
<?xml version="1.0" encoding="UTF-8"?>
<IMSSubscription xmlns:xsi="http://www.w3.org/2001/XMLSchema-instance"
xsi:noNamespaceSchemaLocation="D:\ \CxDataType.xsd">
    <PrivateID>IMPI1@homedomain.com</PrivateID>
    <ServiceProfile>
        <PublicIdentity>                              ; public identity begins
            <Identity> sip:IMPU1@homedomain.com </Identity>
        </PublicIdentity>                             ; public identity ends
        <PublicIdentity>                              ; public identity begins
            <Identity> sip:IMPU2@homedomain.com </Identity>
        </PublicIdentity>                             ; public identity ends
        <PublicIdentity>                              ; public identity begins
            <Identity> sip:IMPU3@homedomain.com </Identity>
        </PublicIdentity>                             ; public identity ends
        <PublicIdentity>                              ; public identity begins
            <Identity> sip:IMPU4@homedomain.com </Identity>
        </PublicIdentity>                             ; public identity ends
            <AliasIdentityList>      ; Alias Identity List begins
            <AliasIdentity >                          ; Alias Identity begins
                <Identity> sip:IMPU1@homedomain.com </Identity>   ; identity of IMPU1
            </AliasIdentity >                         ; Alias Identity ends
            <AliasIdentity >                          ; Alias Identity begins
                <Identity> sip:IMPU2@homedomain.com </Identity>   ; identity of IMPU2
            </AliasIdentity >                         ; Alias Identity ends
        </AliasIdentityList>         ; Alias Identity List ends
            <AliasIdentityList>      ; Alias Identity List begins
            <AliasIdentity >                          ; Alias Identity begins
                <Identity> sip:IMPU3@homedomain.com </Identity>   ; identity of IMPU3
            </AliasIdentity >                         ; Alias Identity ends
```

```
            <AliasIdentity >                           ; Alias Identity begins
                <Identity> sip:IMPU4@homedomain.com </Identity>   ; identity of
IMPU4
            </AliasIdentity >                          ; Alias Identity ends
        <AliasIdentityList>          ; Alias Identity List ends
            <InitialFilterCriteria>
                <Priority>0</Priority>
                <TriggerPoint>
                    <ConditionTypeCNF>1</ConditionTypeCNF>
                    <SPT>
                        <ConditionNegated>0</ConditionNegated>
                        <Group>0</Group>
                      <Method>INVITE</Method>
                    </SPT>
                    <SPT>
                        .
                        .
                        .
                    </SPT>
                </TriggerPoint>
                <ApplicationServer>
    <ServerName>sip:AS1@homedomain.com</ServerName>
                    <DefaultHandling>0</DefaultHandling>
                </ApplicationServer>
            </InitialFilterCriteria>
        </ServiceProfile>
</IMSSubscription>
```

Where, it is an instance of the Alias Identity List from "Alias Identity List begins" to "Alias Identity List ends". In the above XML file, it can be seen that the SP includes two instances of the Alias Identity List. The first instance of the Alias Identity List indicates two alias IMPUs, that is, IMPU1 and IMPU2, have the equivalent behavior. The second instance of the Alias Identity List indicates two alias IMPUs, that is, IMPU3 and IMPU4, have the equivalent behavior.

When the S-CSCF receives the above XML file, it parses the association information of the IMPUs with the equivalent behavior, that is, IMPU1 and IMPU2 have the equivalent behavior and IMPU3 and IMPU4 have the equivalent behavior, according to the indication of the instance of the Alias Identity List.

The method for realizing identity association according to the embodiments of the present invention is described in detail above. In the following, the device for realizing identity association will be described in detail.

Figure 10:
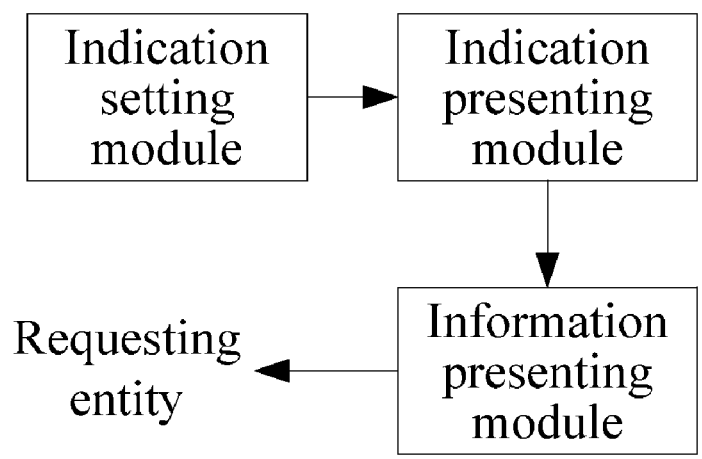
FIG. 10 is a block diagram of a device for realizing user identity association according to the third embodiment of the present invention.

Based on the device shown in FIG. 4, the device according to an embodiment of the present invention further includes an information presenting module. Please refer to FIG. 10, which is a block diagram of the device for realizing identity association according to the third embodiment of the invention.

Where, on the basis of the device described according to FIG. 4, the indication presenting module is further adapted to present the indicated IMPUs with the equivalent behavior to the information presenting module.

The information presenting module is adapted to present the association information of the IMPUs with the equivalent behavior to a requesting entity, according to the information of the IMPUs with the equivalent behavior provided by the indication presenting module. In this embodiment, the requesting entity is the S-CSCF.

Where, when the information presenting module is implemented in detail, it may be the same as that described from steps 802 to 804 in FIG. 8.

In the following, the system for realizing identity association according to the embodiment will be described in detail.

Figure 11:
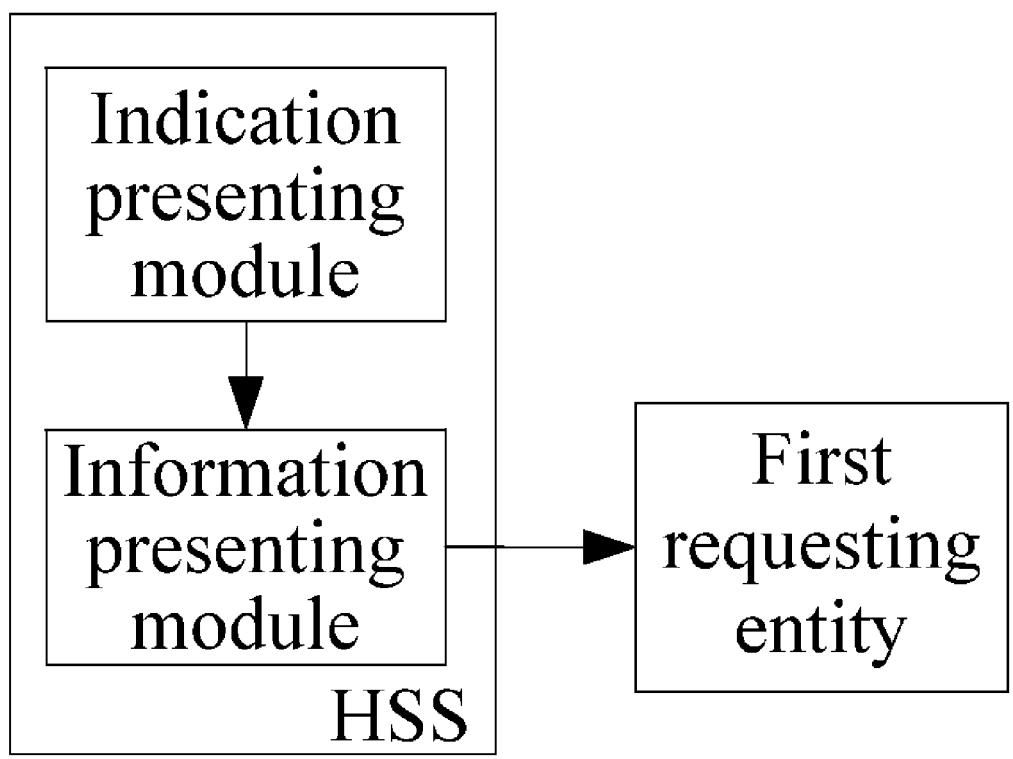
FIG. 11 is a block diagram of a system for realizing user identity association according to the third embodiment of the present invention.

Please refer to FIG. 11, which is a block diagram of the system for realizing identity association according to the third embodiment of the invention. As shown in FIG. 11, the system includes an HSS and a first requesting entity.

Where, the HSS is adapted to associate the IMPUs with the equivalent behavior and to transmit the association information of the IMPUs with the equivalent behavior to the first requesting entity by carrying the information in a message. In this embodiment, the requesting entity is the S-CSCF.

The first requesting entity is adapted to parse the message from the HSS and to obtain the association information of the IMPUs with the equivalent behavior. In this embodiment, the requesting entity is the S-CSCF.

Where, in a detailed implementation, the HSS may include an indication presenting module and an information presenting module.

Where, the indication presenting module is adapted to associate the IMPUs with the equivalent behavior and to provide the information of the indicated IMPUs with the equivalent behavior to the information presenting module.

The information presenting module is adapted to transmit the association information of the IMPUs with the equivalent behavior to the first requesting entity by carrying the information in a message, according to the information of the IMPUs with the equivalent behavior provided by the indication presenting module. In this embodiment, the requesting entity is the S-CSCF.

Where, when the information presenting module is implemented in detail, it may be the same as that described from steps 802 to 804 in FIG. 8.

Furthermore, the HSS may be further adapted to set an equivalent behavior user identifier and to use the set equivalent behavior user identifier to associate the IMPUs with the equivalent behavior. Accordingly, the HSS may further include an indication setting module, which is adapted to set the equivalent behavior user identifier. Thus the indication presenting module is further adapted to associate the IMPUs with the equivalent behavior using the equivalent behavior user identifier set by the indication setting module. In a detailed implementation, the indication setting module may be the same as what is described in Embodiment one or two.

Embodiment Four

Method two is used.

Figure 12:
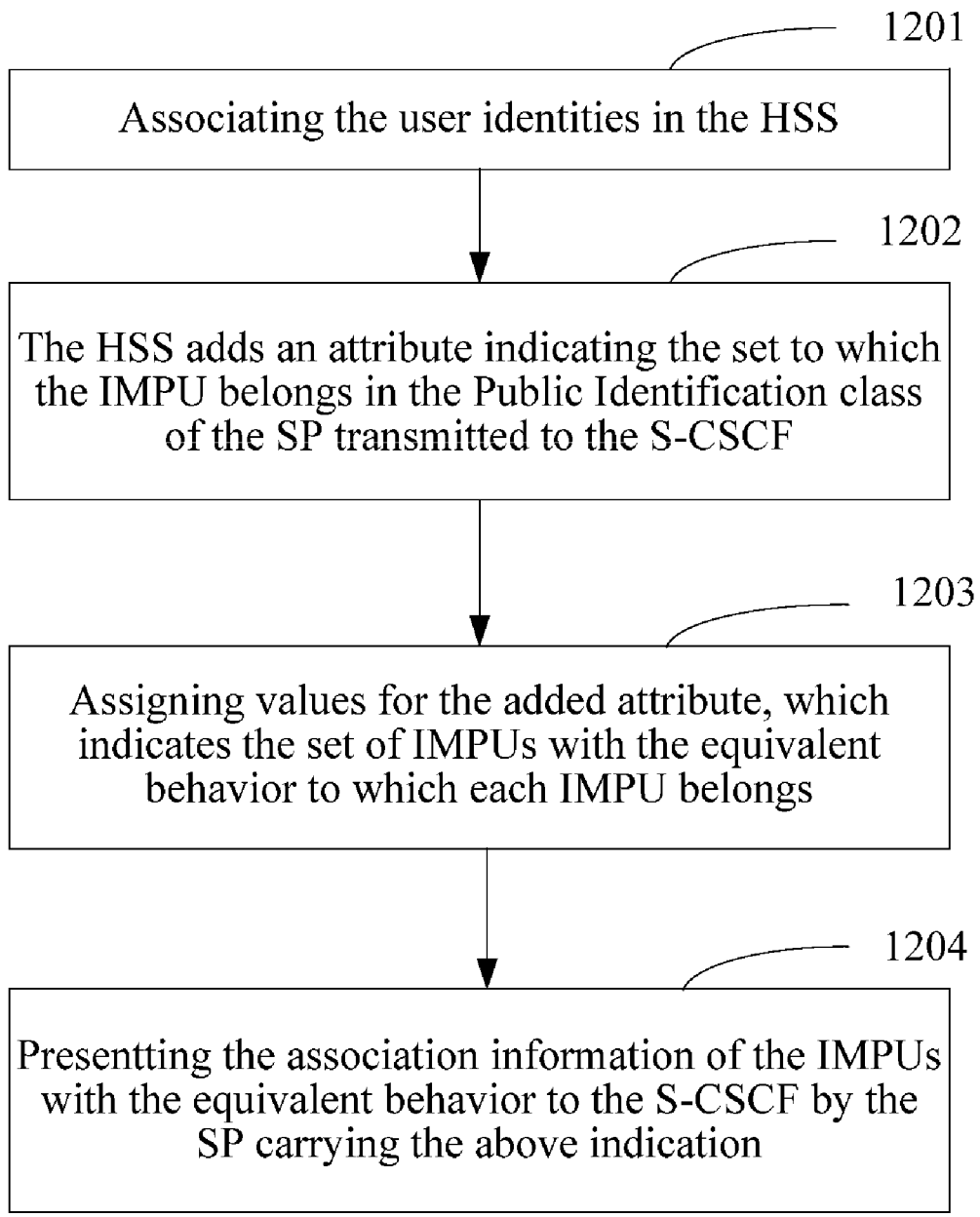
FIG. 12 is a flow chart of a method for realizing user identity association according to a fourth embodiment of the present invention.

Please refer to FIG. 12, which is a flow chart of the method for realizing user identity association according to the fourth embodiment of the invention. As shown in FIG. 12, the flow includes the following steps:

Step 1201: Associating the user identities in the HSS.

The detailed implementation of the step may be the same as the description of embodiment one or two. It may also take other implementation method as actually required.

Step 1202: HSS adds an attribute indicating the set to which the IMPU belongs in the Public Identity class of the SP transmitted to the S-CSCF.

Figure 13:
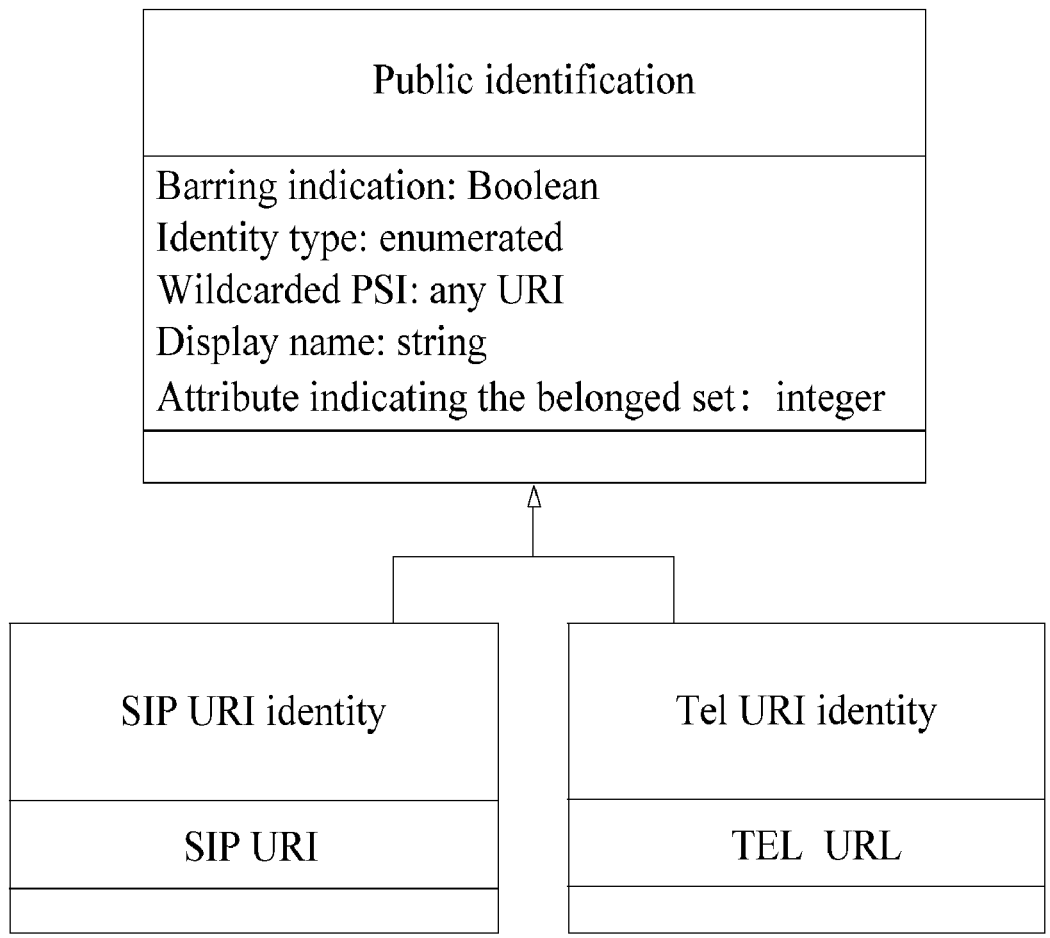
FIG. 13 is a diagram illustrating the structure of Public Identity class according to the fourth embodiment of the present invention.

In the embodiment, when the HSS extends the XML file related to the SP that is transmitted to the S-CSCF, the attribute indicating the set to which the IMPU belongs is added in the Public Identity class of the SP. Please refer to FIG. 13, which is a diagram showing the structure of the Public Identity class according to the embodiment, where an attribute indicating the set to which the IMPU belongs is added.

In a detailed implementation, if the added attribute indicating the set to which the IMPU belongs is named as Alias Identity Set Num, then a description relation mapping of the XML file with the attribute indicating the set to which the IMPU belongs added is as shown in Tables 3 and 4:

TABLE 3

| Data type | Tag | Base type | Comments |
|---|---|---|---|
| tPrivateID | PrivateID | anyURI | Syntax described in IETF RFC 2486 [14] |
| tSIP_URI | Identity | anyURI | Syntax described in IETF RFC 3261 [11] |
| tTEL_URL | Identity | anyURI | Syntax described in IETF RFC 3966 [15] |
| tIdentity | Identity | union | Union of tSIP_URI and tTEL_URL |
| tIdentityType | IdentityType | enumerated | Possible values: 0 (PUBLIC_USER_IDENTITY), representing IMPU 1 (DISTINCT_PSI), representing PSI 2 (WILDCARDED_PSI), representing wildcarded PSI |
| tAliasIdentitySetNum | AliasIdentitySetNum | integer | >=0 |
| tWildcardedPSI | WildcardedPSI | anyURI | Syntax described in 3GPP TS 23.003 [17]. |
| tServiceInfo | ServiceInfo | string | |
| ... | ... | ... | ... |
| tDisplayName | DisplayName | string | |

In Table 3, the attribute indicating the set to which the IMPU belongs is named as Alias Identity Set Num and the Alias Identity Set Num is an integer type. The Alias Identity Set Num may also be other data type such as string. The Alias Identity Set Num is obtained by extending an extension field, which is shown in Table 4:

TABLE 4

| | | Compound of | | |
|---|---|---|---|---|
| Data type | Tag | Tag | Type | Cardinality |
| tIMSSubscription | IMSSubscription | PrivateID | tPrivateID | 1 |
| | | ServiceProfile | tServiceProfile | (1 to n) |
| tServiceProfile | ServiceProfile | PublicIdentity | tPublicIdentity | (0 to n) |
| | | InitialFilterCriteria | tInitialFilterCriteria | (0 to n) |
| | | CoreNetworkServicesAuthorization | CoreNetworkServicesAuthorization | (0 to 1) |
| | | Extension | tServiceProfileExtension | (0 to 1) |
| ... | ... | ... | ... | ... |
| tPublicIdentityExtension | Extension | IdentityType | tIdentityType | (0 to 1) |
| | | WildcardedPSI | tWildcardedPSI | (0 to 1) |
| | | Extension | tPublicIdentityExtension2 | (0 to 1) |
| tPublicIdentityExtension2 | Extension | DisplayName | tDisplayName | (0 to 1) |
| | | AliasIdentitySetNum | tAliasIdentitySetNum | (0 to 1) |

It can be seen from Table 4 that the Alias Identity Set Num is obtained in an extension field of tPublicIdentityExtension2 of the Public Identity. An instance of the Public Identity includes at most one Alias Identity Set Num. When the IMPU in the Public Identity does not have any IMPU with the equivalent behavior, there is no need to add the Alias Identity Set Num in the Public Identity.

Step 1203: Assigning values for the added attribute, which indicates the set of IMPUs with the equivalent behavior to which each IMPU belongs.

If there are two sets of IMPUs with the equivalent behavior and the two sets of IMPUs with the equivalent behavior are marked by 1 and 2 respectively, then the Alias Identity Set Num of the IMPUs in the two sets may be assigned with the value 1 and 2 respectively, which are used to indicate the set of IMPUs with the equivalent behavior to which the IMPU belongs.

Step 1204: HSS presents the association information of the IMPUs with the equivalent behavior to the S-CSCF by the SP carrying the above indication.

In this step, the HSS transmits the XML carrying the SP that indicates the set of IMPUs with the equivalent behavior to which the IMPU belongs to the S-CSCF, and the S-CSCF parses the association information of the IMPUs with the equivalent behavior according to the received XML file.

An example is that IMPU1 and IMPU2 have the equivalent behavior and IMPU3 and IMPU4 have the equivalent behavior. The case there is an IRPUIS and the set of IMPUs with the equivalent behavior is the subset of the IRPUIS is taken as the example. If IMPU1, IMPU2, IMPU3 and IMPU4 are in the same IRPUIS, when the S-CSCF requests the user data of IMPU1 from the HSS through the SAR, the content of the XML file carried in the SAA is as follows:

```
<?xml version="1.0" encoding="UTF-8"?>
<IMSSubscription xmlns:xsi="http://www.w3.org/2001/XMLSchema-instance"
xsi:noNamespaceSchemaLocation="D:\\CxDataType.xsd">
    <PrivateID>IMPI1@homedomain.com</PrivateID>
    <ServiceProfile>
        <PublicIdentity>                                    ; public identity begins
            <AliasIdentitySetNum>1</AliasIdentitySetNum>    ; value of Alias Identity Set Num is 1
            <Identity> sip:IMPU1@homedomain.com </Identity>
        </PublicIdentity>                                   ; public identity ends
        <PublicIdentity>                                    ; public identity begins
            <AliasIdentitySetNum>1</AliasIdentitySetNum>    ;value of Alias Identity Set Num is 1
            <Identity> sip:IMPU2@homedomain.com </Identity>
        </PublicIdentity>                                   ; public identity ends
        <PublicIdentity>                                    ;public identity begins
            <AliasIdentitySetNum>2</AliasIdentitySetNum>    ;value of Alias Identity Set Num is 2
            <Identity> sip:IMPU3@homedomain.com </Identity>
        </PublicIdentity>                                   ; public identity ends
        <PublicIdentity>                                    ; public identity begins
            <AliasIdentitySetNum>2</AliasIdentitySetNum>    ;value of Alias Identity Set Num is 2
            <Identity> sip:IMPU4@homedomain.com </Identity>
        </PublicIdentity>                                   ; public identity ends
        <InitialFilterCriteria>
            <Priority>0</Priority>
            <TriggerPoint>
                <ConditionTypeCNF>1</ConditionTypeCNF>
                <SPT>
                    <ConditionNegated>0</ConditionNegated>
                    <Group>0</Group>
                    <Method>INVITE</Method>
                </SPT>
                <SPT>
                    .
                    .
                    .
                </SPT>
            </TriggerPoint>
            <ApplicationServer>
                <ServerName>sip:AS1@homedomain.com</ServerName>
                <DefaultHandling>0</DefaultHandling>
            </ApplicationServer>
        </InitialFilterCriteria>
    </ServiceProfile>
</IMSSubscription>
```

Figure 15:
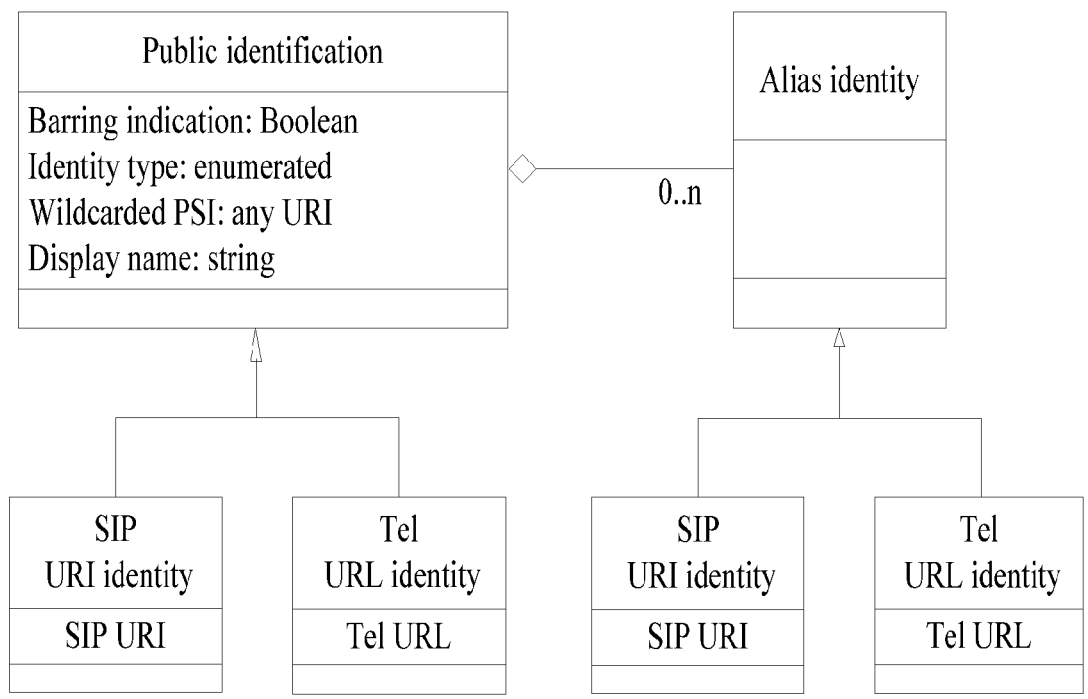
FIG. 15 is a diagram illustrating the structure of Public Identity class according to the fifth embodiment of the present invention.

The set of IMPUs with the equivalent behavior to which the IMPU belongs may be indicated by assigning values to the Alias Identity Set Num. Based on the above XML file, in the instance of the Public Identity class of the IMPU1, the Alias Identity Set Num is 1, which shows that the IMPU1 belongs to set 1; in the instance of the Public Identity class of the IMPU2, the Alias Identity Set Num is 1, which shows that the IMPU2 belongs to set 1; in the instance of the Public Identity class of the IMPU3, the Alias Identity Set Num is 2, which shows that the IMPU2 belongs to set 2; in the instance of the Public Identity class of the IMPU4, the Alias Identity Set Num is 2, which shows that the IMPU2 belongs to set 2.

the members of the set to which the IMPU belongs by adding a new class in the Public Identity class in the SP. Please refer to FIG. 15, which is a schematic diagram of the structure of the Public Identity class according to the embodiment, in which a class indicating the members of the set to which the IMPU belongs is added.

In a detailed implementation, if the added class indicating the members of the set to which the IMPU belongs is named Alias Identity, then a description relation mapping of the XML file with the class that indicates the members of the set to which the IMPU belongs is as shown in Table 5:

TABLE 5

| Data type | Tag | Compound of Tag | Type | Cardinality |
|---|---|---|---|---|
| tIMSSubscription | IMSSubscription | PrivateID | tPrivateID | 1 |
|  |  | ServiceProfile | tServiceProfile | (1 to n) |
| tServiceProfile | ServiceProfile | PublicIdentity | tPublicIdentity | (1 to n) |
|  |  | InitialFilterCriteria | tInitialFilterCriteria | (0 to n) |
|  |  | CoreNetworkServicesAuthorization | CoreNetworkServicesAuthorization | (0 to 1) |
|  |  | Extension | tServiceProfileExtension | (0 to 1) |
| ... | ... | ... | ... | ... |
| tPublicIdentityExtension | Extension | IdentityType | tIdentityType | (0 to 1) |
|  |  | WildcardedPSI | tWildcardedPSI | (0 to 1) |
|  |  | Extension | tPublicIdentityExtension2 | (0 to 1) |
| tPublicIdentityExtension2 | Extension | DisplayName | tDisplayName | (0 to 1) |
|  |  | AliasIdentity | tAliasIdentity | (0 to n) |
| tAliasIdentity | AliasIdentity | Identity | tIdentity | (1) |

When the S-CSCF receives the above XML file, it parses the association information of the IMPUs with the equivalent behavior, that is, IMPU1 and IMPU2 have the equivalent behavior and IMPU3 and IMPU4 have the equivalent behavior, according to the indication of the Alias Identity Set Num.

The method for realizing identity association according to the embodiment is described in detail above.

The structure, connection relationship and function of the device according to the embodiment are the same as the device of Embodiment three except that a detailed implementation of the information presenting module in the device according to the embodiment may be the same as that described from steps 1202 to 1204 in FIG. 12.

Furthermore, the structure, connection relationship and function of the system according to the embodiment are the same as the system of Embodiment three except that a detailed implementation of the Information Presenting Module of the HSS in the embodiment may be the same as that described from steps 1202 to 1204 in FIG. 12.

Embodiment Five

Method three is used.

Figure 14:
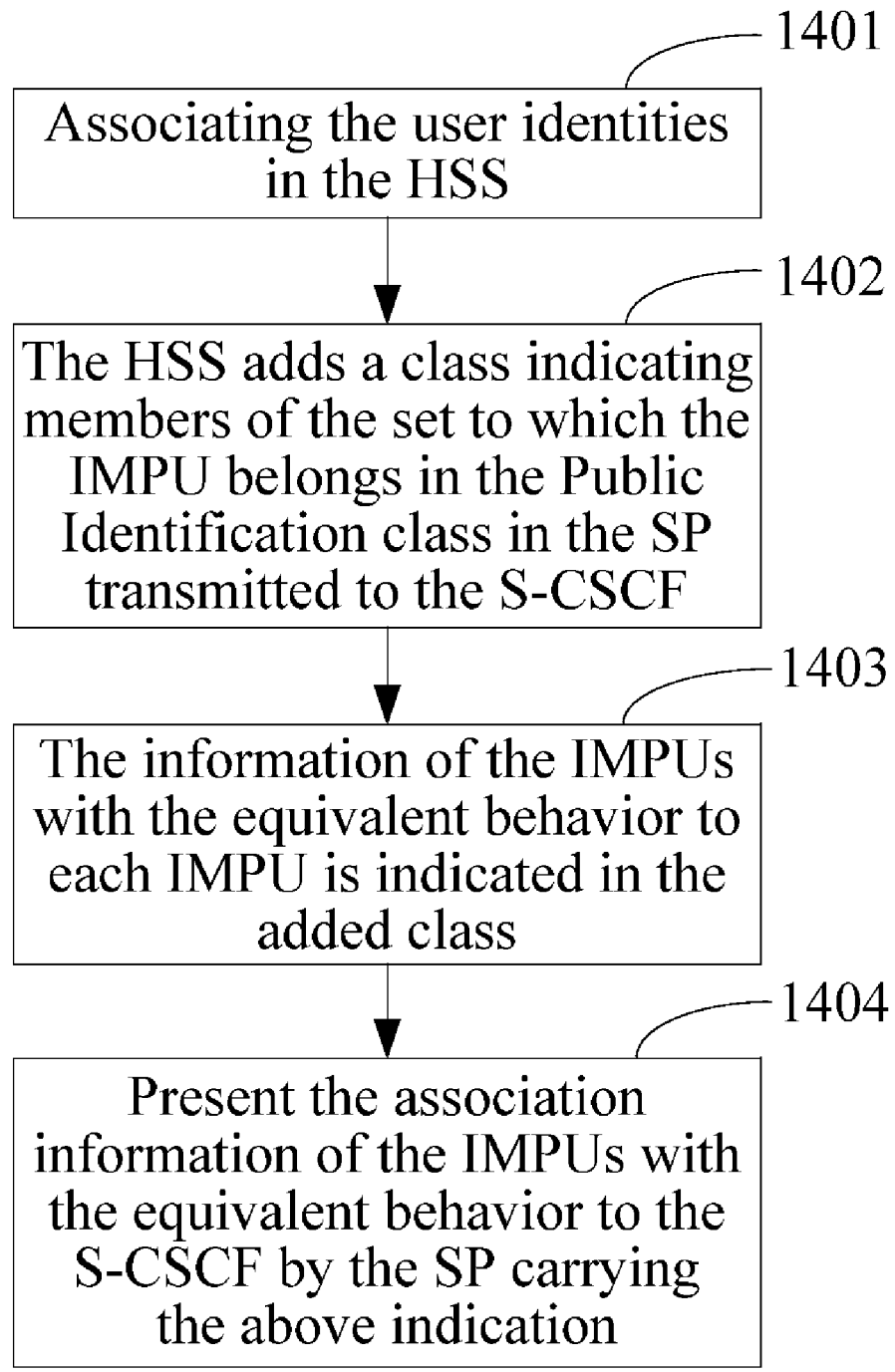
FIG. 14 is a flow chart of a method for realizing user identity association according to a fifth embodiment of the present invention.

Please refer to FIG. 14, which is a flow chart of the method for realizing user identity association according to the fifth embodiment of the invention. As shown in FIG. 14, the flow includes the following steps:

Step 1401: Associating the user identities in the HSS.

The detailed implementation of the step may be the same as the description of embodiment one or two. It may also take other implementation method as actually required.

Step 1402: HSS adds a class indicating members of the set to which the IMPU belongs in the Public Identity class in the SP transmitted to the S-CSCF.

In this embodiment, when the HSS extends the XML file related to the SP transmitted to the S-CSCF, it may indicate In Table 5, the class indicating the members of the set is named Alias Identity, which is obtained in an extension field of tPublicIdentityExtension2 in the Public Identity. When there is no IMPU having the equivalent behavior to the identity in the Public Identity, the number of instance of the Alias Identity class is 0. When there is more than one IMPU having the equivalent behavior to the identity in the Public Identity, the number of instance of the Alias Identity class is more than one. One Alias Identity class includes an Identity attribute, which is similar to Identity in the Public Identity class shown in FIG. 7. Also the Identity in the Alias Identity class may be in the form of SIP URI or TEL URI; where, an Identity corresponds to an IMPU with the equivalent behavior.

Step 1403: The information of the IMPUs with the equivalent behavior to each IMPU is indicated in the added class.

Assuming that IMPU1 and IMPU2 are IMPUs having the equivalent behavior, then the information of IMPU2 is indicated in the Alias Identity attribute of IMPU1, and the information of IMPU1 is indicated in the Alias Identity attribute of IMPU2. Similarly, if IMPU1 IMPU2 and IMPU3 are IMPUs having the equivalent behavior, then the information of IMPU2 and IMPU3 is indicated in the Alias Identity attribute of IMPU1, the information of IMPU1 and IMPU3 is indicated in the Alias Identity attribute of IMPU2, and the information of IMPU1 and IMPU2 is indicated in the Alias Identity attribute of IMPU3.

Steps 1404: HSS presents the association information of the IMPUs with the equivalent behavior to the S-CSCF by the SP carrying the above indication.

In this step, the HSS transmits the XML carrying the SP that indicates the IMPUs having the equivalent behavior to each IMPU to the S-CSCF, and the S-CSCF parses the association information of the IMPUs with the equivalent behavior according to the received XML file.

An example is that IMPU1 and IMPU2 have the equivalent behavior and IMPU3 and IMPU4 have the equivalent behavior. The case of there is an IRPUIS and the set of IMPUs with the equivalent behavior is the subset of the IRPUIS is taken as the example. If IMPU1, IMPU2, IMPU3 and IMPU4 are in the same IRPUIS, when the S-CSCF requests the user data of IMPU1 from the HSS through the SAR, the content of the XML file carried in the SAA is as follows:

device of Embodiment three except that a detailed implementation of the information presenting module in the device according to the embodiment may be the same as that described from steps 1402 to 1404 in FIG. 14.

Furthermore, the structure, connection relationship and function of the system according to the embodiment are the

```
<?xml version="1.0" encoding="UTF-8"?>
<IMSSubscription xmlns:xsi="http://www.w3.org/2001/XMLSchema-instance"
xsi:noNamespaceSchemaLocation="D:\\CxDataType.xsd">
    <PrivateID>IMPI1@homedomain.com</PrivateID>
    <ServiceProfile>
        <PublicIdentity>                                              ; Public Identity begins
            <AliasIdentity>                          ; Alias Identity begins
                <Identity> sip:IMPU2@homedomain.com </Identity>
            </AliasIdentity>                         ; Alias Identity ends
            <Identity> sip:IMPU1@homedomain.com </Identity>
        </PublicIdentity>                 ; Public Identity ends
        <PublicIdentity>                                              ;Public Identity begins
            <AliasIdentity>                          ; Alias Identity begins
                <Identity> sip:IMPU1@homedomain.com </Identity>
            </AliasIdentity>                         ; Alias Identity ends
            <Identity> sip:IMPU2@homedomain.com </Identity>
        </PublicIdentity>                 ; Public Identity ends
        <PublicIdentity>                                              ; Public Identity begins
            <AliasIdentity>                          ; Alias Identity begins
                <Identity> sip:IMPU4@homedomain.com </Identity>
            </AliasIdentity>                         ; Alias Identity ends
            <Identity> sip:IMPU3@homedomain.com </Identity>
        </PublicIdentity>                 ; Public Identity ends
        <PublicIdentity>                                              ; Public Identity begins
            <AliasIdentity>                          ; Alias Identity begins
                <Identity> sip:IMPU3@homedomain.com </Identity>
            </AliasIdentity>                         ; Alias Identity ends
            <Identity> sip:IMPU4@homedomain.com </Identity>
        </PublicIdentity>                 ; Public Identity ends
        <InitialFilterCriteria>
            <Priority>0</Priority>
            <TriggerPoint>
                <ConditionTypeCNF>1</ConditionTypeCNF>
                <SPT>
                    <ConditionNegated>0</ConditionNegated>
                    <Group>0</Group>
                    <Method>INVITE</Method>
                </SPT>
                <SPT>
                    .
                    .
                </SPT>
            </TriggerPoint>
            <ApplicationServer>
                <ServerName>sip:AS1@homedomain.com</ServerName>
                <DefaultHandling>0</DefaultHandling>
            </ApplicationServer>
        </InitialFilterCriteria>
    </ServiceProfile>
</IMSSubscription>
```

In the above XML file, the Alias Identity in the instance of the Public Identity class of IMPU1 carries the information of IMPU2 and the Alias Identity in the instance of the Public Identity class of IMPU2 carries the information of IMPU1. Similarly, the Alias Identity in the instance of the Public Identity class of IMPU3 carries the information of IMPU4 and the Alias Identity in the instance of the Public Identity class of IMPU4 carries the information of IMPU3.

When the S-CSCF receives the above XML file, it parses out the association information of the IMPUs with the equivalent behavior, that is, IMPU1 and IMPU2 have the equivalent behavior and IMPU3 and IMPU4 have the equivalent behavior, according to the indication of the Alias Identity.

The method for realizing identity association according to the embodiment is described in detail above.

The structure, connection relationship and function of the device according to the embodiment are the same as the same as the system of Embodiment three except that a detailed implementation of the Information Presenting Module of the HSS in the embodiment may be the same as that described from steps 1402 to 1404 in FIG. 14.

Embodiment Six

Method four is used.

Figure 16:
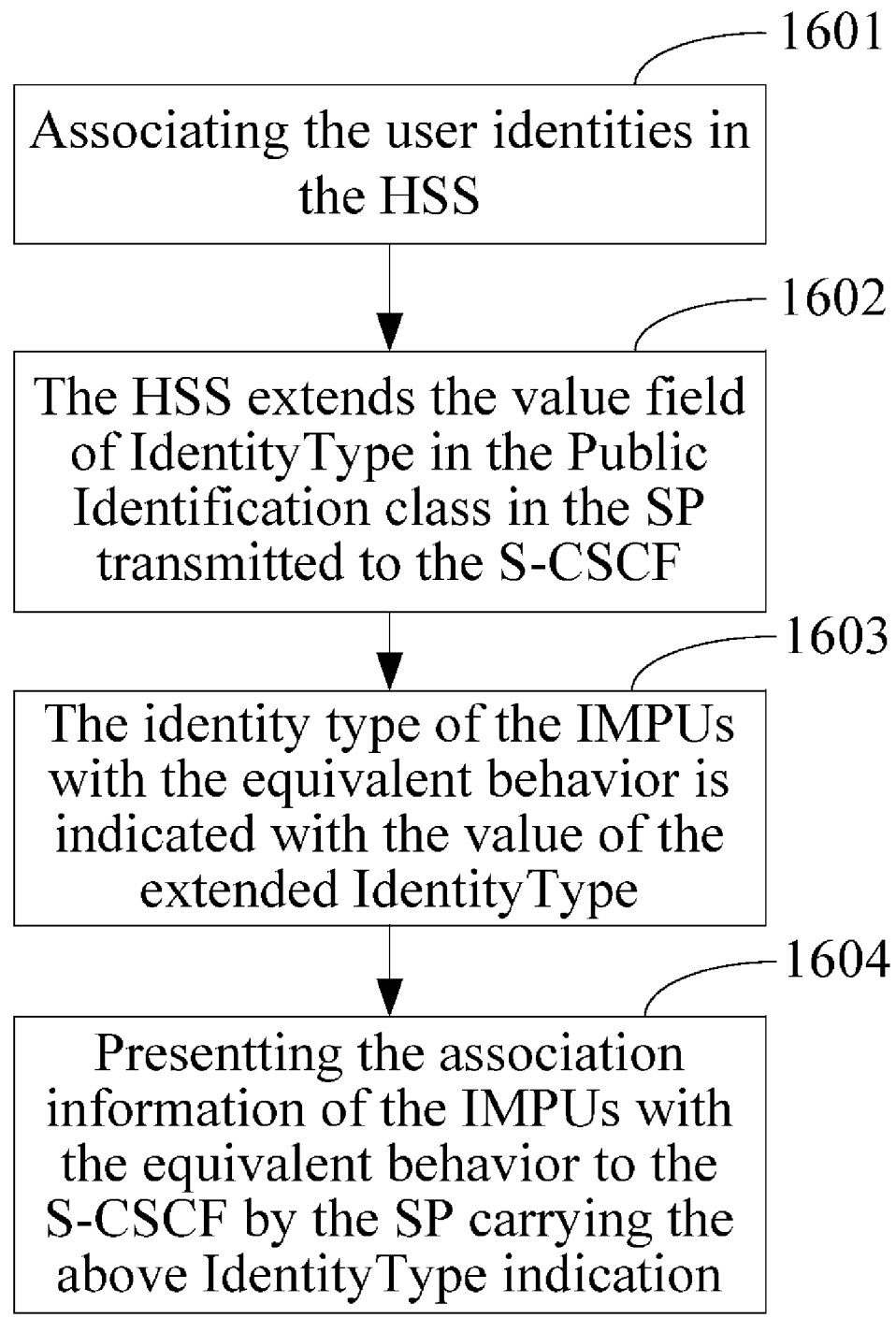
FIG. 16 is a flow chart of a method for realizing user identity association according to a sixth embodiment of the present invention.

This embodiment is more suitable for the case of having only one set of IMPUs with the equivalent behavior. Please refer to FIG. 16, which is a flow chart of the method for realizing user identity association according to the sixth embodiment of the invention. As shown in FIG. 16, the flow includes the following steps:

Step 1601: Associating the user identities in the HSS.

The detailed implementation of the step may be the same as the description of embodiment one or two. It may also take other implementation method as actually required.

Step 1602: HSS extends the value field of IdentityType in the Public Identity class in the SP transmitted to the S-CSCF.

In this step, the value field of IdentityType is extended and an enumerated type is added. The original IdentityType is enumerated type and has the values of 0, 1 and 2. Here, 0 represents IMPU, 1 represents PSI and 2 represents wildcarded PSI. Thus, in the embodiment, an enumerated value 3 representing the IMPUs with the equivalent behavior is added based on the original IdentityType.

In a specific implementation, if the extended IdentityType is named Alias_Public_User_Identity, then a description relation mapping of the XML file with the extended IdentityType is as shown in Table 6:

TABLE 6

| Data type | Tag | Base type | Comments |
|---|---|---|---|
| tPrivateID | PrivateID | anyURI | Syntax described in IETF RFC 2486 [14] |
| tSIP_URI | Identity | anyURI | Syntax described in IETF RFC 3261 [11] |
| tTEL_URL | Identity | anyURI | Syntax described in IETF RFC 3966 [15] |
| tIdentity | Identity | union | Union of tSIP_URI and tTEL_URL |
| tIdentityType | IdentityType | enumerated | Possible values:<br>0 (PUBLIC_USER_IDENTITY), represent IMPU<br>1 (DISTINCT_PSI), reprents PSI<br>2 (WILDCARDED_PSI) represents wildcarded PSI<br>3 (ALIAS_PUBLIC_USER_IDENTITY), represents ALIAS_PUBLIC_USER_IDENTITY |
| tWildcardedPSI | WildcardedPSI | anyURI | Syntax described in 3GPP TS 23.003 [17]. |
| tServiceInfo | ServiceInfo | string | |
| ... | ... | ... | ... |
| tDisplayName | DisplayName | string | |

Step 1603: The identity type of the IMPUs with the equivalent behavior is indicated with the value of the extended IdentityType.

If the IMPU belongs to a set of IMPUs with the equivalent behavior, the value of 3 of the extended IdentityType may be used to indicate that the identity type of the IMPU is an IMPU with the equivalent behavior, that is, the named ALIAS_PUBLIC_USER_IDENTITY in the Table 6.

Step 1604: HSS presents the association information of the IMPUs with the equivalent behavior to the S-CSCF by the SP carrying the above IdentityType indication.

In this step, the HSS transmits the XML carrying the SP that indicates the set of IMPUs with the equivalent behavior to which the IMPU belongs to the S-CSCF, and the S-CSCF parses the association information of the IMPUs with the equivalent behavior according to the received XML file.

An example is that IMPU1 and IMPU2 have the equivalent behavior and there is an IRPUIS and the set of IMPUs with the equivalent behavior is the subset of the IRPUIS. If IMPU1, IMPU2, IMPU3 and IMPU4 are in the same IRPUIS, when the S-CSCF requests the user data of IMPU1 from the HSS through the SAR, the content of the XML file carried in the SAA is as follows:

```
<?xml version="1.0" encoding="UTF-8"?>
<IMSSubscription xmlns:xsi="http://www.w3.org/2001/XMLSchema-instance"
xsi:noNamespaceSchemaLocation="D:\ \CxDataType.xsd">
    <PrivateID>IMPI1@homedomain.com</PrivateID>
    <ServiceProfile>
        <PublicIdentity>                                    ; Public Identity begins
            <IdentityType>3</IdentityType> ; value of IdentityType is 3
            <Identity> sip:IMPU1@homedomain.com </Identity>
        </PublicIdentity>                                   ; Public Identity ends
        <PublicIdentity>                                    ; Public Identity begins
```

```
            <IdentityType>3</IdentityType> ; value of IdentityType is 3
            <Identity> sip:IMPU2@homedomain.com </Identity>
        </PublicIdentity>                           ; Public Identity ends
        <PublicIdentity>                            ; Public Identity begins
            <Identity> sip:IMPU3@homedomain.com </Identity>
        </PublicIdentity>                           ; Public Identity ends
        <PublicIdentity>                            ; Public Identity begins
            <Identity> sip:IMPU4@homedomain.com </Identity>
        </PublicIdentity>                           ; Public Identity ends
        <InitialFilterCriteria>
            <Priority>0</Priority>
            <TriggerPoint>
                <ConditionTypeCNF>1</ConditionTypeCNF>
                <SPT>
                    <ConditionNegated>0</ConditionNegated>
                    <Group>0</Group>
                    <Method>INVITE</Method>
                </SPT>
                <SPT>
                        .
                        .
                        .
                </SPT>
            </TriggerPoint>
            <ApplicationServer>
                <ServerName>sip:AS1@homedomain.com</ServerName>
                <DefaultHandling>0</DefaultHandling>
            </ApplicationServer>
        </InitialFilterCriteria>
    </ServiceProfile>
</IMSSubscription>
```

The IMPUs with the equivalent behavior are indicated by setting the type of the IMPUs with the equivalent behavior to the extended IdentityType value. In the above XML file, in the instance of the Public Identity class of the IMPU1, the value of IdentityType is 3; in the instance of the Public Identity class of the IMPU2, the value of IdentityType is 3, which shows that IMPU1 and IMPU2 have the equivalent behavior.

When the S-CSCF receives the above XML file, it parses the association information of the IMPUs with the equivalent behavior, that is, IMPU1 and IMPU2 have the equivalent behavior, according to the indication of the value of IdentityType.

The method for realizing identity association according to the embodiment is described in detail above.

The structure, connection relationship and function of the device according to the embodiment are the same as the device of Embodiment three except that a detailed implementation of the information presenting module in the device according to the embodiment may be the same as that described from steps 1602 to 1604 in FIG. 16.

Furthermore, the structure, connection relationship and function of the system according to the embodiment are the same as the system of Embodiment three except that a detailed implementation of the Information Presenting Module of the HSS in the embodiment may be the same as that described from steps 1602 to 1604 in FIG. 16.

Embodiment Seven

Method five is used.

Figure 17:
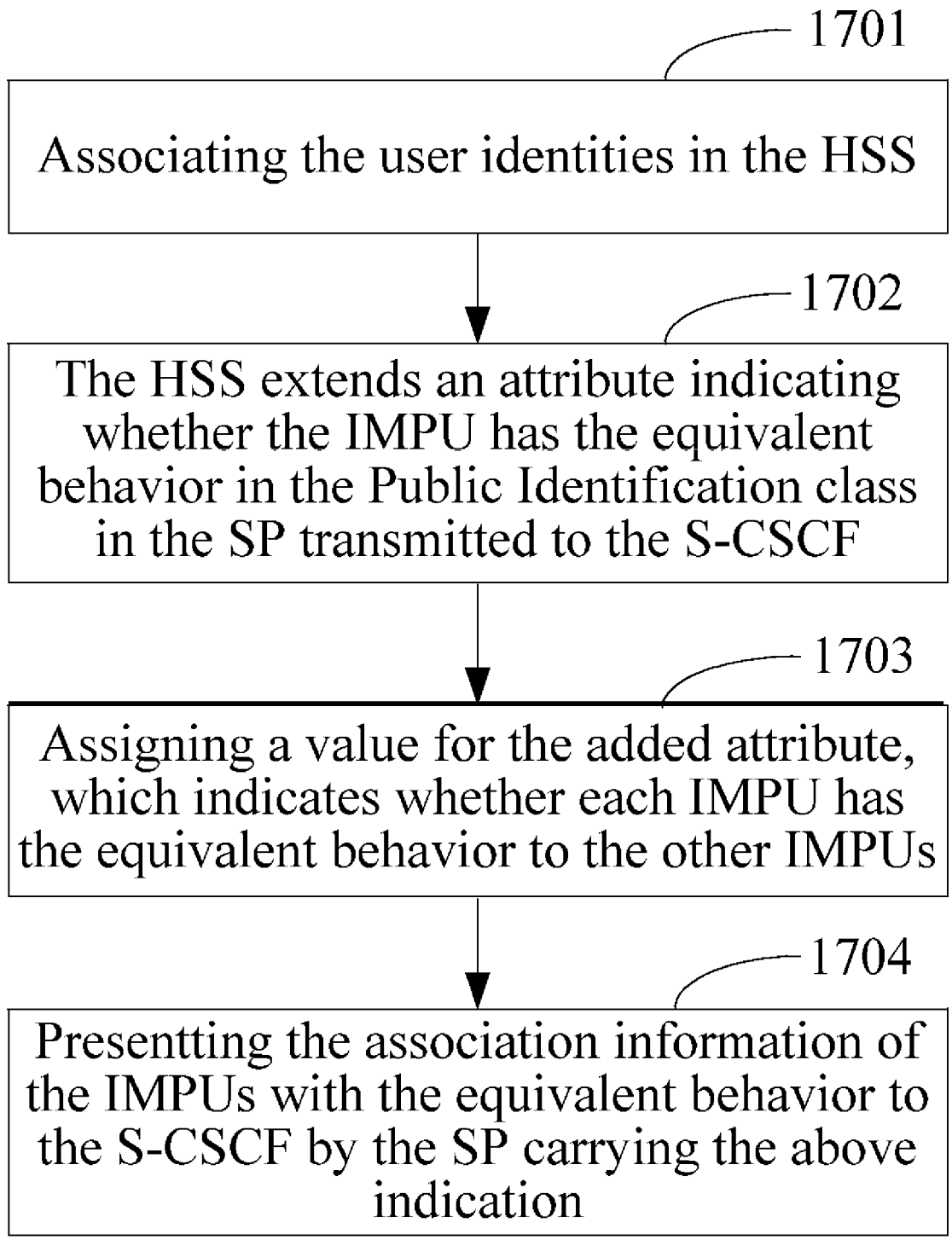
FIG. 17 is a flow chart of a method for realizing user identity association according to a seventh embodiment of the present invention.

This embodiment is more suitable for the case of having only one set of IMPUs with the equivalent behavior among the IMPUs having the same SP. Please refer to FIG. 17, which is a flow chart of the method for realizing user identity association according to the seventh embodiment of the invention. As shown in FIG. 17, the flow includes the following steps:

Step 1701: Associating the user identities in the HSS.

The detailed implementation of the step may be the same as the description of Embodiment one or two. It may also take other implementation method as actually required.

Step 1702: HSS extends the Public Identity class in the SP transmitted to the S-CSCF.

In this step, the Public Identity class is extended and an attribute indicating whether the IMPU is an IMPU with the equivalent behavior is added. The attribute is a Boolean type.

When the value of the attribute is true or larger than zero, it shows that the IMPU has the equivalent behavior to other IMPUs whose attribute value is also true or larger than zero.

When the value of the attribute is false or equal to zero, it shows that the IMPU does not have the same behavior to any other IMPU.

Figure 18:
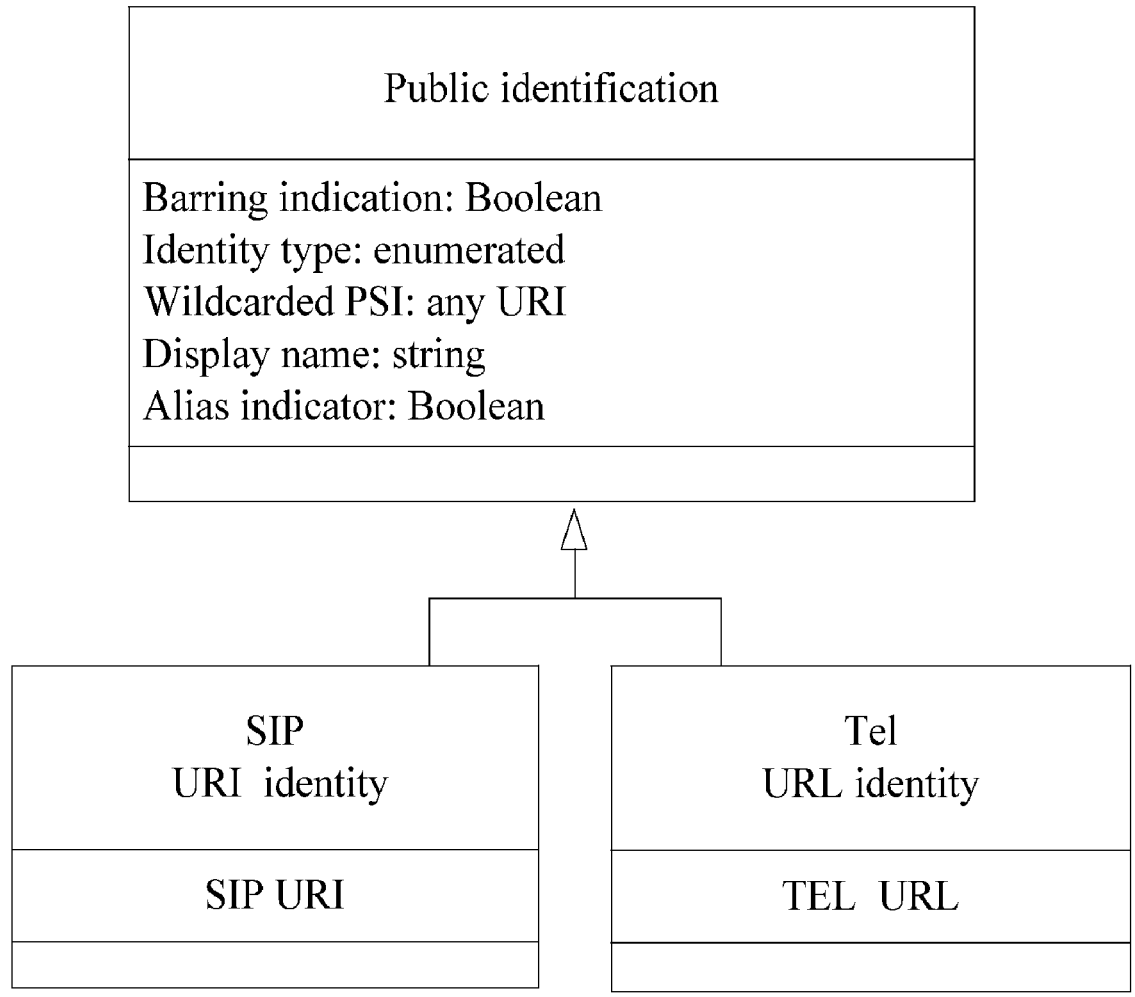
FIG. 18 is a diagram illustrating the structure of Public Identity class according to the seventh embodiment of the present invention.

In this embodiment, when the HSS extends the XML file related to the SP transmitted to the S-CSCF, it may add the attribute indicating whether the IMPU is an IMPU with the equivalent behavior in the Public Identity class in the SP. Please refer to FIG. 18, which is a schematic diagram of the structure of the Public Identity class according to the embodiment, in which an attribute indicating whether the IMPU is an IMPU with the equivalent behavior is added.

In a detailed implementation, if the extended attribute is named AliasIndicator, then a description relation mapping of the XML file with the extended Public Identity class is as shown in Tables 7 and 8:

TABLE 7

| Data type | Tag | Base type | Comments |
| --- | --- | --- | --- |
| tPrivateID | PrivateID | anyURI | Syntax described in IETF RFC 2486 [14] |

TABLE 7-continued

| Data type | Tag | Base type | Comments |
| --- | --- | --- | --- |
| tSIP_URI | Identity | anyURI | Syntax described in IETF RFC 3261 [11] |
| tTEL_URL | Identity | anyURI | Syntax described in IETF RFC 3966 [15] |
| tIdentity | Identity | union | Union of tSIP_URI and tTEL_URL |
| tIdentityType | IdentityType | enumerated | Possible values: 0 (PUBLIC_USER_IDENTITY), represents IMPU 1 (DISTINCT_PSI), represents PSI 2 (WILDCARDED_PSI), represents wildcarded PSI |
| tWildcardedPSI | WildcardedPSI | anyURI | Syntax described in 3GPP TS 23.003 [17]. |
| tServiceInfo | ServiceInfo | string | |
| ... | ... | ... | ... |
| tBool | ConditionTypeCNF, ConditionNegated, BarringIndication AliasIndicator | Boolean | Possible values: 0 (false) 1 (rue) |
| ... | ... | ... | ... |

In Table 7, the attribute indicating whether the IMPU is an IMPU with the equivalent behavior is named AliasIndicator and is added to a Tag corresponding to the data type tBool.

The attribute indicating whether the IMPU is an IMPU with the equivalent behavior is named AliasIndicator and the type of which is defined as Boolean type. The Alias Identity Set Number is obtained by extending an extension field as shown in Table 8:

TABLE 8

| | | Compound of | | |
| --- | --- | --- | --- | --- |
| Data type | Tag | Tag | Type | Cardinality |
| tIMSSubscription | IMSSubscription | PrivateID | tPrivateID | 1 |
| | | ServiceProfile | tServiceProfile | (1 to n) |
| tServiceProfile | ServiceProfile | PublicIdentity | tPublicIdentity | (1 to n) |
| | | InitialFilterCriteria | tInitialFilterCriteria | (0 to n) |
| | | CoreNetworkServicesAuthorization | CoreNetworkServicesAuthorization | (0 to 1) |
| | | Extension | tServiceProfileExtension | (0 to 1) |
| ... | ... | ... | ... | ... |
| tPublicIdentityExtension | Extension | IdentityType | tIdentityType | (0 to 1) |
| | | WildcardedPSI | tWildcardedPSI | (0 to 1) |
| | | Extension | tPublicIdentityExtension2 | (0 to 1) |
| tPublicIdentityExtension2 | Extension | DisplayName | tDisplayName | (0 to 1) |
| | | AliasIndicator | tBool | (0 to 1) |

It can be seen from Table 8 that the AliasIndicator is obtained in an extension field of tPublicIdentityExtension2 in the Public Identity. An instance of the Public Identity class includes at most one AliasIndicator. When there is no IMPU having the equivalent behavior to the IMPU in the Public Identity, there is no need to add the AliasIndicator to the Public Identity.

Step 1703: Assigning a value for the added attribute, which indicates whether each IMPU has the equivalent behavior to other IMPUs.

Step 1704: HSS presents the association information of the IMPUs with the equivalent behavior to the S-CSCF by the SP carrying the above indication.

In this step, the HSS transmits the XML carrying the SP that indicates whether each IMPU is an IMPU having the equivalent behavior to the S-CSCF, and the S-CSCF parses the association information of the IMPUs with the equivalent behavior according to the received XML file.

An example is that IMPU1 and IMPU2 have the equivalent behavior and there is an IRPUIS and the set of IMPUs with the equivalent behavior is the subset of the IRPUIS. If IMPU1, IMPU2 and IMPU3 are in the same IRPUIS and have the same SP, when the S-CSCF requests the user data of IMPU1 from the HSS through the SAR, the content of the XML file carried in the SAA is as follows:

```
<?xml version="1.0" encoding="UTF-8"?>
<IMSSubscription xmlns:xsi="http://www.w3.org/2001/XMLSchema-instance"
xsi:noNamespaceSchemaLocation="D:\\CxDataType.xsd">
    <PrivateID>IMPI1@homedomain.com</PrivateID>
    <ServiceProfile>
        <PublicIdentity>                                  ; Public Identity begins
            <AliasIndicator>1</AliasIndicator> ; value of AliasIndicator is 1 or
true
            <Identity> sip:IMPU1@homedomain.com </Identity>
        </PublicIdentity>                                 ; Public Identity ends
        <PublicIdentity>                                  ; Public Identity begins
            <AliasIndicator>1</AliasIndicator> value of AliasIndicator is 1 or
true
            <Identity> sip:IMPU2@homedomain.com </Identity>
        </PublicIdentity>                    ; Public Identity ends
        <PublicIdentity>                                  ; Public Identity begins
            <Identity> sip:IMPU3@homedomain.com </Identity>
        </PublicIdentity>                                 ; Public Identity ends
        <InitialFilterCriteria>
            <Priority>0</Priority>
            <TriggerPoint>
                <ConditionTypeCNF>1</ConditionTypeCNF>
                <SPT>
                    <ConditionNegated>0</ConditionNegated>
                    <Group>0</Group>
                    <Method>INVITE</Method>
                </SPT>
                <SPT>

.
                     .
                     .

</SPT>
            </TriggerPoint>
            <ApplicationServer>
                <ServerName>sip:AS1@homedomain.com</ServerName>
                <DefaultHandling>0</DefaultHandling>
            </ApplicationServer>
        </InitialFilterCriteria>
    </ServiceProfile>
</IMSSubscription>
```

Whether the IMPU has the equivalent behavior to the other IMPUs is indicated by assigning a value for the AliasIndicator. In the above XML file, in the instance of the Public Identity class of the IMPU1, the value of AliasIndicator is 1, which shows that IMPU1 is an IMPU having the equivalent behavior; in the instance of the Public Identity class of the IMPU2, the value of AliasIndicator is 1, which shows that IMPU2 is an IMPU having the equivalent behavior; in the instance of the Public Identity class of the IMPU3, there is no AliasIndicator, which shows that IMPU3 is not an IMPU having the equivalent behavior.

When the S-CSCF receives the above XML file, it parses out the association information of the IMPUs with the equivalent behavior, that is, IMPU1 and IMPU2 have the equivalent behavior and IMPU3 does not have the equivalent behavior to the other IMPUs, according to the indication of the AliasIndicator.

The method for realizing identity association according to the embodiment is described in detail above.

The structure, connection relationship and function of the device according to the embodiment are the same as the device of Embodiment three except that a detailed implementation of the information presenting module in the device according to the embodiment may be the same as that described from steps 1702 to 1704 in FIG. 17.

Furthermore, the structure, connection relationship and function of the system according to the embodiment are the same as the system of Embodiment three except that a detailed implementation of the Information Presenting Module of the HSS in the embodiment may be the same as that described from steps 1702 to 1704 in FIG. 17. The procedure of presenting the association information of the IMPUs with the equivalent behavior to the S-CSCF by the HSS is described in detail with the above description of Embodiments three to seven.

Furthermore, the S-CSCF may present the association information of the IMPUs obtained from the HSS to the UE, P-CSCF and AS.

In the prior art, the UE may obtain the information of the non-barred IMPUs which belong to the same IRPUIS as the registered IMPU through registration, and then obtain the registration state of all the non-barred IMPUs related to the user by subscribing an event packet from the S-CSCF.

When the UE is registered, after downloading the user data from the HSS using the SAR message, the S-CSCF can get to know the information of the IMPUs with the equivalent behavior to the registered user. Since the user will subscribe to notification of an reg-event event after receiving a response 200 OK to the registration request, thus, in order to make it possible for the S-CSCF to present the association information of the IMPUs to the UE, the subscribed event packet may be extended and the information is transmitted to the UE by adding the information to the Notify message of reg-event. Here, the message interaction between the S-CSCF and UE is done through the interface Gm. In the following, the method will be described in detail with reference to the embodiments.

Embodiment Eight

Figure 19:
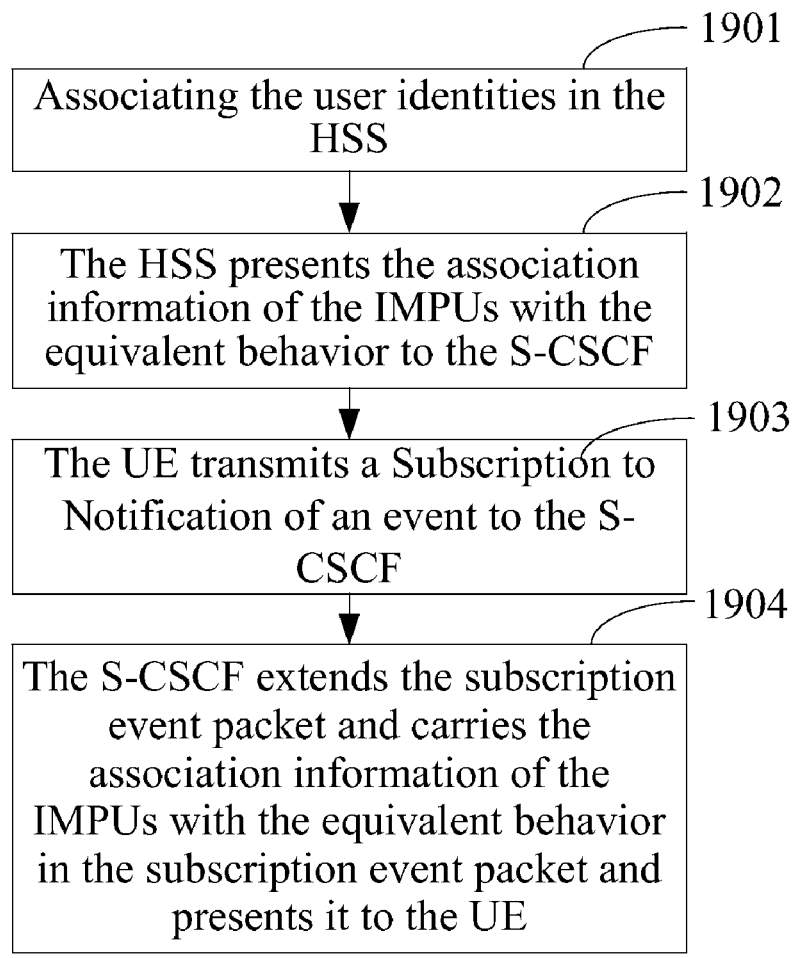
FIG. 19 is a flow chart of a method for realizing user identity association according to an eighth embodiment of the present invention.

Please refer to FIG. 19, which is a flow chart of the method for realizing user identity association according to the eighth embodiment of the invention. As shown in FIG. 19, the flow includes the following steps:

Step 1901: Associating the user identities in the HSS.

The detailed implementation of the step may be the same as the description of embodiment one or two. It may also take other implementation method as actually required.

Step 1902: HSS presents the association information of the IMPUs with the equivalent behavior to the S-CSCF.

In this step, the HSS may present the association information of the IMPUs with the equivalent behavior to the S-CSCF when the S-CSCF transmits the SAR message and requests to download the user data when the UE is registered.

In this step, the S-CSCF extends the subscribed reg-event packet. For example, one or more information elements (IEs) may be added to a registration IE in the XML file for transmission, and the IEs may include the IMPUs with the equivalent behavior to each IMPU. For example, the IE may be named as Alias Identity.

Taking FIG. 2 as an example, if IMPU3 and IMPU4 of FIG. 2 are the IMPUs with the equivalent behavior of the invention, when IMPU3 and IMPU4 subscribes to notification of the reg-event during the registration procedure, the S-CSCF will transmit a Notify message to the UE, and the message carries the association information of each IMPU. Please see the following:

```
NOTIFY sip:[5555::aaa:bbb:ccc:ddd]:1357;comp=sigcomp SIP/2.0
Via: SIP/2.0/UDP scscf.homedomain.com;branch=z9hG4bK332b23.1
Max-Forwards: 70
Route: <sip:pcscf. homedomain.com;lr>
From: <sip: IMPU3@homedomain.com>;tag=31415
To: <sip: IMPU4@homedomain.com>;tag=151170
Call-ID:
CSeq: 42 NOTIFY
Subscription-State: active;expires=600000
Event: reg
Content-Type: application/reginfo+xml
Contact: <sip:scscf.homedomain.com>
Content-Length: (...)
<?xml version="1.0"?>
<reginfo xmlns="urn:ietf:params:xml:ns:reginfo"
        version="1" state="full">
    <registration aor="sip: IMPU3@homedomain.com" id="a7" state="active"> ; registration
begins
        <contact id="76" state="active" event="registered">
            <uri>sip:[5555::aaa:bbb:ccc:ddd]</uri>
        </contact>
            <AliasIdentity>                             ; Alias Identity beings
            <uri>sip: IMPU4@homedomain.com</uri>
            </AliasIdentity>                            ; Alias Identity ends
    </registration> ;                           registration ends
    <registration aor="sip: IMPU4@homedomain.com" id="a8" state="active"> ;
registration begins
        <contact id="77" state="active" event="registered">
            <uri>sip:[5555::aaa:bbb:ccc:ddd]</uri>
        </contact>
            <AliasIdentity>                             ; Alias Identity beings
            <uri>sip: IMPU3@homedomain.com</uri>
            </AliasIdentity>                            ; Alias Identity ends
    </registration>                         ; registration ends
        <registration aor="sip: IMPU1@homedomain.com" id="a9" state="active">
        <contact id="77" state="active" event="created">
            <uri>sip:[5555::aaa:bbb:ccc:ddd]</uri>
        </contact>
    </registration>
    .
    .
    .
</reginfo>
```

Here, the detailed implementation of presenting the association information of the IMPUs with the equivalent behavior to the S-CSCF by the HSS may be the same as the description of any of Embodiments three to seven.

Step 1903: UE sends a subscription to notification of an Event to the S-CSCF.

In this step, the UE may send subscription to notification of a reg-event to the S-CSCF.

Step 1904: S-CSCF extends the subscribed event packet and carries the association information of the IMPUs with the equivalent behavior in the subscribed event packet and presents it to the UE.

In the Notify message, it can be seen that in the registration IE of IMPU3 the AliasIdentity IE carrying IMPU4 is added, and in the registration IE of IMPU4 the AliasIdentity IE carrying IMPU3 is added.

Upon receiving the Notify message, the UE may obtain the association information of IMPU3 and IMPU4 having the equivalent behavior from the message.

The method for realizing identity association according to an embodiment of the invention is described in detail in the above.

The device for realizing identity association according to the invention may be the same as the description of any of the devices of Embodiment three to seven.

The system for realizing identity association according to the invention will be described in detail in the following.

Figure 20:
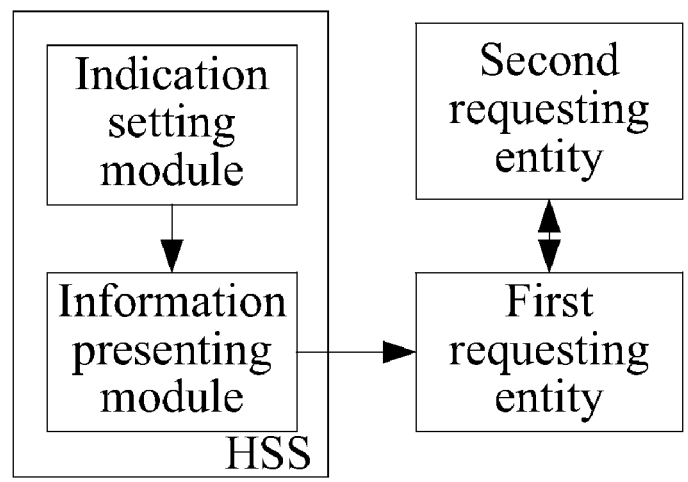
FIG. 20 is a block diagram of a system for realizing user identity association according to the eighth embodiment of the present invention.

Please refer to FIG. 20, which is a block diagram of the system for realizing identity association according to the eighth embodiment of the invention. As shown in FIG. 20, on the basis of any of the system of Embodiment three to seven, the system for realizing identity association according to the embodiment further includes a second requesting entity. In the embodiment, the second requesting entity is a UE.

Where, the S-CSCF is further adapted to receiving a subscription event notification from the second requesting entity, and to present the association information of the IMPUs with the equivalent behavior to the second requesting entity by carrying the association information in the subscribed event packet, according to the received subscription event notification. In the embodiment, the second requesting entity is a UE.

The second requesting entity is adapted to transmit the subscription event notification to the S-CSCF, to receive the event packet from the S-CSCF, and to parse the association information of the IMPUs with the equivalent behavior from the received event packet. In the embodiment, the second requesting entity is a UE.

Furthermore, if the AS also subscribes to the reg-event event notification through a third party subscription when the user is registered, the S-CSCF may also present the association information of the IMPUs with the equivalent behavior obtained through the SAA or PPR to the AS by adding the association information to the Notify message of reg-event. Here, the information interaction between the AS and S-CSCF is done through the interface ISC.

Similarly, the P-CSCF may also subscribe to the reg-event event notification from the S-CSCF when the user is registered, the S-CSCF may also present the association information of the IMPUs with the equivalent behavior obtained through the SAA or PPR to the P-CSCF by adding the association information to the Notify message of reg-event. Here, the information interaction between the P-CSCF and S-CSCF is done through the interface Mw.

Here, the methods of presenting the association information of the IMPUs with the equivalent behavior to the requesting entities UE, and/or AS, and/or P-CSCF by S-CSCF may be the same, that is to say, the detailed implementation may be the same as the description of Embodiment eight. The difference just lies in that the association information of the IMPUs with the equivalent behavior is presented to different requesting entities according to the different requesting entities.

Accordingly, in the system, the second requesting entity is the AS or P-CSCF. The procedures will not be elaborated here since they are similar to each other.

Furthermore, in the prior art, the information interaction between the AS and HSS may be done through the interface Sh etc. The AS may indicate requesting information of the public identity of the user by setting the value of Data-Reference AVP to IMSPublicIdentity (10) in the User-Data-Request (UDR) message. The HSS then returns the corresponding public identity to the AS in the User-Data-Answer (UDA), according to the type of the public identity indicated in Identity-Set AVP in the message.

Furthermore, the AS may also subscribe to the public identity information by setting the value of Data-Reference AVP as IMSPublicIdentity (10) in the Subscribe-Notification-Request (SNR) message. When the public identity changes, the HSS transmits the related data to the AS through the Push-Notification-Request (PNR) message, according to the public identity type indicated in the Identity-Set AVP. Alternatively, the requested public identity is first transmitted to the AS through the Subscribe-Notifications-Answer (SNA) message, then the related data is transmitted to the AS through the PNR message when the public identity changes.

Base on the above procedure, it can be seen that the HS returns the corresponding public identity information to the AS according to the type of the public identity indicated in the Identity-Set AVP in the request message, when the AS requests the public identity information from the HSS.

Here, Identity-Set may take four values: ALL_IDENTITIES (0), REGISTERED_DENTITIES (1), IMPLICIT_IDENTITIES (2) or ALIAS_IDENTITIES (3).

When the value is ALL_IDENTITIES, the HSS returns non-barred IMPUs corresponding to all the IMPIs associated with the IMPU in the request message to the AS. When the value is REGISTERED_DENTITIES, the HSS returns non-barred registered IMPUs corresponding to all the IMPIs associated with the IMPU in the request message to the AS. When the value is IMPLICIT_IDENTITIES, the HSS returns non-barred IMPUs belonging to the same IRPUIS as the IMPU in the request message to the AS. When the value is ALIAS_IDENTITIES, the HSS returns non-barred IMPUs having the same SP in the IRPUIS of the IMPU in the request message to the AS.

In the embodiment of the invention, in order to make it possible for the HSS to present to the AS the association information of the IMPUs with the equivalent behavior, the AS may transmit to the HSS a request for the IMPUs with the equivalent behavior, then the HSS presents to the AS the non-barred IMPUs with the equivalent behavior as the IMPU in the request message, according to the request. To this end, the values of Identity-Set may be extended, the detailed procedure of which will be described in the following with reference to the embodiment.

Embodiment Nine

Figure 21:
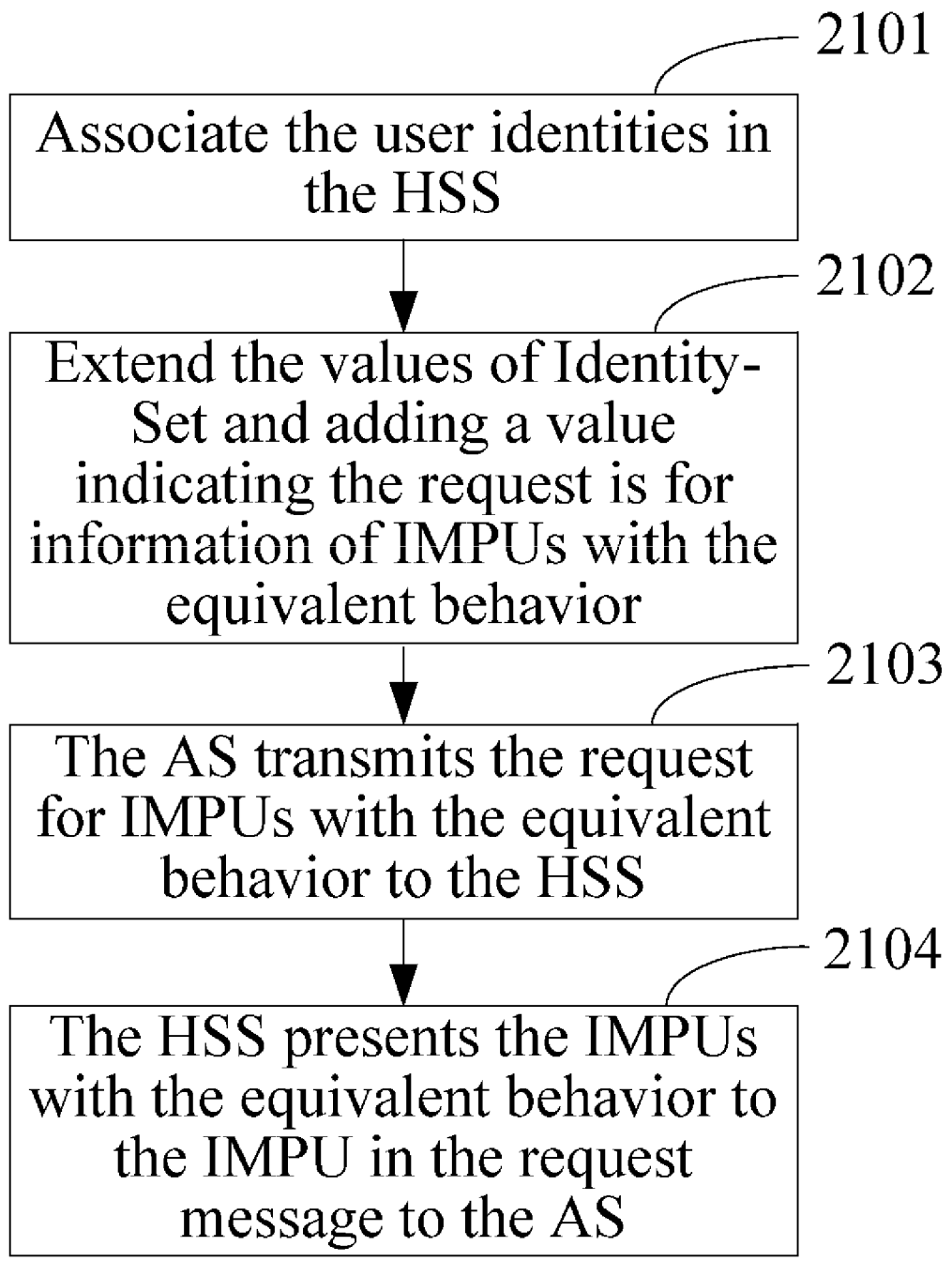
FIG. 21 is a flow chart of a method for realizing user identity association according to a ninth embodiment of the present invention.

Please refer to FIG. 21, which is a flow chart of the method for realizing user identity association according to the ninth embodiment of the invention. As shown in FIG. 21, the flow includes the following steps:

Step 2101: Associating the user identities in the HSS.

The detailed implementation of the step may be the same as the description of Embodiment one or two. It may also take other implementation method as actually required.

Step 2102: Extending the values of Identity-Set and adding a value indicating the request for information of IMPUs with the equivalent behavior.

In this step, the values of Identity-Set are extended and a value 4 is added, and the added value is named ALIAS_GROUP_IDENTITIES, that is, ALIAS_GROUP_IDENTITIES (4), which indicates the request for the IMPUs with the equivalent behavior.

Step 2103: An AS transmits the request for IMPUs with the equivalent behavior to the HSS.

In this step, the AS may transmit the request for IMPUs information to the HSS using the UDR or SNR message, and the value Identity-Set is set to ALIAS_GROUP_IDENTITIES (4) in the message. That is, Identity-Set VAP is used to indicate the identity type of the equivalent behavior.

Step 2104: HSS presents the IMPUs with the equivalent behavior to the IMPU in the request message to the AS.

In this step, the HSS presents to the AS the non-barred IMPUs with the equivalent behavior to the IMPU in the request message, or the information of the corresponding changed IMPUs, using the UDA message, or SNA message, or PNR message.

In addition to the scenario described in FIG. 21, the scenario of the value of Identity-Set being ALIAS_IDENTITIES (3) may be re-defined as well. That is, ALIAS_IDENTITIES (3) is used to indicate the request for the IMPUs with the equivalent behavior instead of the request for the IMPUs with the same SP in the IRPUIS. Thus, when the AS value of Identity-Set in the request message transmitted from the AS to the HSS is ALIAS_IDENTITIES (3), the HSS may transmit the non-barred IMPUs with the equivalent behavior to the IMPU in the request message to the AS.

The method for realizing identity association according to the embodiment is described in detail above.

The structure, connection relationship and function of the device according to the embodiment are the same as the device of Embodiment three except that the requesting entity in the embodiment is the AS. Meanwhile, a detailed implementation of the information presenting module in the device may be the same as that described from steps 2102 to 2104 in FIG. 21, or the same as the description of the value ALIAS_IDENTITIES (3) of Identity-Set being redefined.

The structure, connection relationship and function of the system according to the embodiment are the same as the system of Embodiment three except that the first requesting entity in the embodiment is the AS. Meanwhile, a detailed implementation of the information presenting module in the HSS may be the same as that described from steps 2102 to 2104 in FIG. 21, or the same as the description of the value ALIAS_IDENTITIES (3) of Identity-Set being redefined.

The detailed implementations described above further describe the objects, technical solutions and advantages of the invention. It should be understood that what are described above are only preferred embodiments of the invention, and are not intended to limit the scope of the disclosure. Any modification, equivalent substitution and improvement within the spirit and scope of the disclosure are intended to be included in the scope of the disclosure.

What is claimed is:

1. A method for identifying Public User Identity, comprising:
    setting an equivalent behavior user identifier in a Home Subscription Server (HSS);
    identifying IP Multimedia Subsystem (IMS) Public User Identities (IMPUs) with the equivalent behavior through the set equivalent behavior user identifier, wherein the IMPUs with the equivalent behavior are linked to a same Service Profile (SP) and have same service data;
    adding, by the HSS, an attribute indicating a set of IMPUs to which an IMPU belongs, to a Public Identity class in an SP transmitted to a Serving Call Session Control Function (S-CSCF);
    indicating set of IMPUs with the equivalent behavior to which each IMPU belongs by assigning a value to the attribute; and
    presenting, by the HSS, the identifying information to the S-CSCF, by the SP carrying the indication.

2. The method of claim 1, wherein the IMPUs with the equivalent behavior belong to a same Implicitly Registered Public User Identity Set (IRPUIS).

3. The method of claim 1, wherein the setting the equivalent behavior user identifier in a HSS comprises:
    setting in an HSS an indication used for indicating a set of IMPUs with the equivalent behavior.

4. The method of claim 3, wherein the setting in an HSS an indication used for indicating a set of IMPUs with the equivalent behavior comprises:
    adding a type of data in the HSS, wherein the type of data is configured to indicate an Alias Public User Identity Set.

5. The method of claim 1, wherein the setting the equivalent behavior user identifier in the HSS comprises:
    setting with an IMPU of the HSS an indication used for indicating a set of IMPUs with the equivalent behavior to which the IMPU belongs; or
    setting with an IMPU of the HSS an indication used for indicating that the IMPU belongs to a set of IMPUS with the equivalent behavior.

6. The method of claim 1, wherein the SP refers to a set of user subscription data related to a service.

7. The method of claim 1, wherein the same service data refers to the same forwarded to address information or same representation information.

8. The method of claim 1, wherein the method further comprises: presenting, by the HSS, identifying information to the S-CSCF via a Cx interface.

9. The method of claim 1, transmitting, by a requesting entity, a subscription to notification of an event to the S-CSCF;
    presenting, by the S-CSCF, the identifying information of the IMPUs with the equivalent behavior to the requesting entity by carrying the identifying information in the subscribed event packet, according to the subscribed notification of the event;
    wherein the requesting entity is a User Equipment (UE), an Application Server (AS) or a Proxy-CSCF (P-CSCF).

10. The method of claim 1, wherein the method further comprises:
    requesting, by an AS, the IMPUs with the equivalent behavior from the HSS; and
    presenting, by the HSS, the IMPUs with the equivalent behavior to the AS, according to the request.

11. The method of claim 10, wherein the step of requesting, by the AS, the IMPUs with the equivalent behavior from the HSS comprises: indicating, by the AS, an identity type of the equivalent behavior using an identity set attribute value pair (AVP), carrying the identity set AVP indicating the identity type of the equivalent behavior in the requesting message and transmitting the identity set AVP to the HSS;
    the step of presenting, by the HSS, the IMPUs with the equivalent behavior to the AS according to the request comprises: presenting, by the HSS, IMPUs with the equivalent behavior as the IMPU in the request message to the AS, according to the identity type of the equivalent behavior as indicated in the request message.

12. A device for identifying user identity, comprising an indication setting module, an indication presenting module, and an information presenting module, wherein:
    the indication setting module is configured to set an equivalent behavior user identifier in an HSS; and
    the indication presenting module is configured to identify IMPUs with the equivalent behavior using the equivalent behavior user identifier set by the indication setting module; wherein the IMPUs with the equivalent behavior are linked to a same Service Profile (SP) and have same service data;
    the information presenting module is configured to add an attribute indicating a set of IMPUs to which an IMPU belongs, to a Public Identity class in an SP transmitted to a Serving Call Session Control Function (S-CSCF); indicate set of IMPUs with the equivalent behavior to which each IMPU belongs by assigning a value to the attribute; and present the identifying information to the S-CSCF, by the SP carrying the indication.

13. The device of claim 12, wherein
    the indication presenting module is configured to provide information of the indicated IMPUs with the equivalent behavior to the information presenting module and present identifying information of the IMPUs with the equivalent behavior to a requesting entity, according to the information of the indicated IMPUs with the equivalent behavior provided by the indication presenting module.

14. A system for identifying user identity comprising an HSS and a first requesting entity, wherein:

the HSS is configured to identify IMPUs with equivalent behavior and to transmit association information of the IMPUs with the equivalent behavior to the first requesting entity by carrying the information in a message, wherein the IMPUs with the equivalent behavior are linked to a same Service Profile (SP) and have same service data; and the HSS is configured to add an attribute indicating a set of IMPUs to which an IMPU belongs, to a Public Identity class in an SP transmitted to a first requesting identity; indicate set of IMPUs with the equivalent behavior to which each IMPU belongs by assigning a value to the attribute; and present, by the HSS, the identifying information to the first requesting identity, by the SP carrying the indication the first requesting entity is configured to parse the message from the HSS and to obtain the association information of the IMPUs with the equivalent behavior from the message.

15. The system of claim 14, wherein the HSS comprises an indication presenting module and an information presenting module, wherein the indication presenting module is configured to identify the IMPUs with the equivalent behavior and to provide the information of the indicated IMPUs with the equivalent behavior to the information presenting module; and the information presenting module is configured to present the association information of the IMPUs with the equivalent behavior to the first requesting entity, according to the information of the indicated IMPUs with the equivalent behavior provided by the indication presenting module.

16. The system of claim 15, wherein the system further comprises a second requesting entity;

the first requesting identity is further configured to receive a subscription to notification of an event from the second requesting entity, and to present the association information of the IMPUs with the equivalent behavior to the second requesting entity by carrying the association information in the subscribed event packet, according to the subscription to notification of the event; and the second requesting entity is configured to transmit the subscription to notification of the event to the first requesting identity, to receive the event packet from the first requesting identity, and to parse the association information of the IMPUs with the equivalent behavior from the received event packet.

17. The system of claim 16, wherein the second requesting entity is a UE, an AS or a P-CSCF.

* * * * *